United States Patent [19]

Pechanek et al.

[11] Patent Number: 5,542,026
[45] Date of Patent: Jul. 30, 1996

[54] TRIANGULAR SCALABLE NEURAL ARRAY PROCESSOR

[75] Inventors: Gerald G. Pechanek, Endwell; Stamatis Vassiliadis, Vestal, both of N.Y.

[73] Assignee: International Business Machines Corporation, Armonk, N.Y.

[21] Appl. No.: 362,087

[22] Filed: Dec. 22, 1994

Related U.S. Application Data

[62] Division of Ser. No. 231,853, Apr. 22, 1994, Pat. No. 5,509,106, which is a continuation of Ser. No. 682,786, Apr. 8, 1991, abandoned, which is a continuation-in-part of Ser. No. 526,866, May 22, 1990, Pat. No. 5,065,339.

[51] Int. Cl.⁶ ..................................................... G06F 15/18
[52] U.S. Cl. .................................................. 395/27; 395/24
[58] Field of Search ........................................ 395/24, 27

[56] References Cited

U.S. PATENT DOCUMENTS

| | | | |
|---|---|---|---|
| 5,021,988 | 6/1991 | Mashiko | ..................... 395/24 |
| 5,276,773 | 1/1994 | Knauer et al. | ............................. 395/27 |
| 5,293,457 | 3/1994 | Arima et al. | ............................... 395/24 |

OTHER PUBLICATIONS

Kung et al., "A Triangular Array Processor for Kalman Filtering", Proc. of EUSIPCO–88, 4th European Signal Processing Conf. vol. 1 5–8 Sep. 1988.

Ward et al., "The Application and Development of Wavefront Array Processors for Advanced Front–End Signal Processing systems", 1st Inter. Workshop on Systolic Arrays, Oxford U.K., 2–4 Jul. 1988.

*Primary Examiner*—George B. Davis
*Attorney, Agent, or Firm*—Lynn L. Augspurger; Eugene I. Shkurko; John E. Hoel

[57] ABSTRACT

A triangular scalable neural array processor unit for use in a neural network has an array of weight registers, multipliers, communicating adder trees, sigmoid generators, and a reverse feedback loop for communicating the output of a sigmoid generator back to input multipliers of selected neurons. The communicating adder trees provide the selectable feedback path.

10 Claims, 43 Drawing Sheets

PERIOD = $2(\log_2 N)C + \delta_S + (L)C(2)$

WHERE L = BIT LENGTH OF MULTIPLIERS

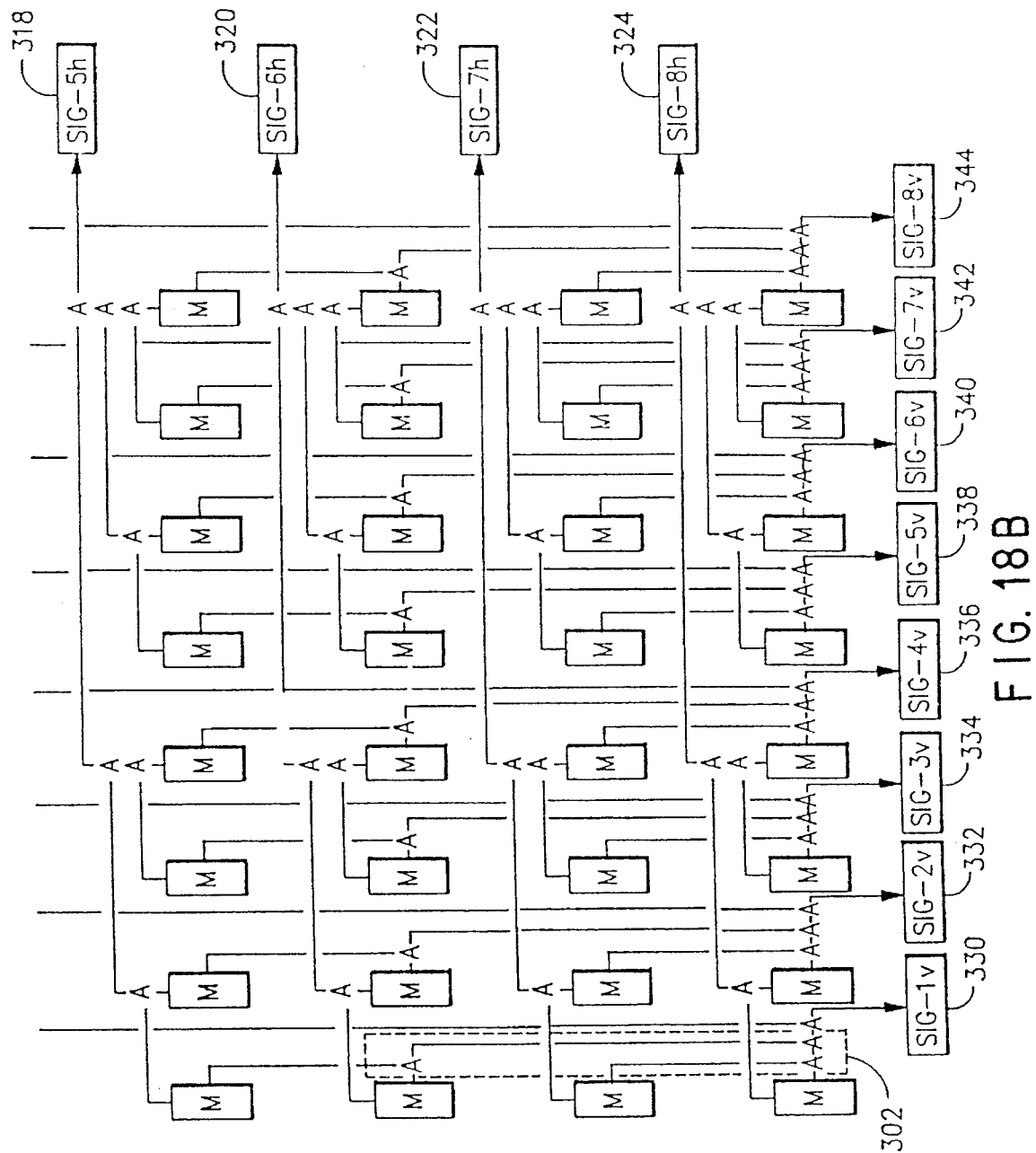

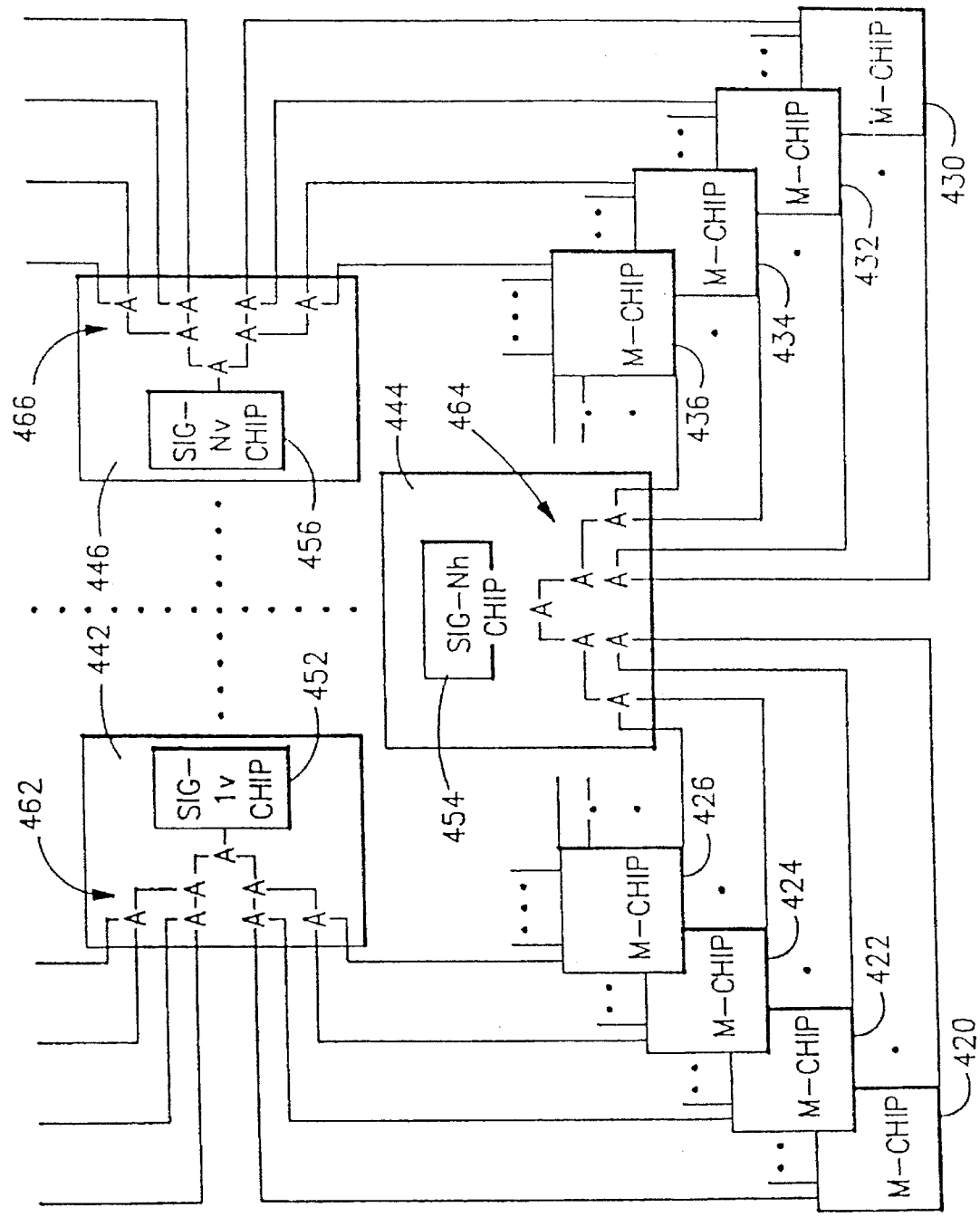

| | |
|---|---|
| INPUT FUNCTION $I_i$ | $I_i = \sum_{J=1}^{N} W_{ij} Y_j$ |
| ACTIVITY FUNCTION $Y_i(t)$ | $Y_i = F(I_i)$ <br> $Y_i = \dfrac{1}{(1 + e^{-K \times I_i})}$ |
| NETWORK CONNECTIVITY | FULL CONNECTIVITY – EACH NEURON CONNECTS TO EVERY OTHER NEURON INCLUDING ITSELF. |

TABLE 1: NEURAL NETWORK COMPUTATION EXAMPLE

FIG. 32

| PE-1 | PE-2 | PE-N |
|---|---|---|
| 1 - Y1*W11 | Y2*W22 | YN*WNN |
| 2 - ACC1 = Y1*W11 | ACC2 = Y2*W22 | ACCN = YN*WNN |
| 3 - PE-1 ← Y2 | PE-2 ← Y3 | PE-N ← Y1 |
| 4 - Y2*W12 | Y3*W23 | Y1*WN1 |
| 5 - ACC1 = ACC1+Y2*W12 | ACC2 = ACC2+Y3*W23 | ACCN = ACCN+Y1*WN1 |
| 6 - PE-1 ← Y3 | PE-2 ← Y4 | PE-N ← Y2 |

MULTIPLY, ACCUMULATE, AND SHIFT UNTIL N-1 ACCUMULATE OPERATIONS ARE COMPLETED.

| | | |
|---|---|---|
| 7 - PE-1 ← Y1 | PE-2 ← Y2 | PE-N ← YN |
| 8 - Y1' = F(ACC1) | Y2' = F(ACC2) | YN' = F(ACCN) |
| 9 - CONTINUE WITH THE NEXT NETWORK UPDATE CYCLE. | | |

TABLE 2: OPERATION SEQUENCE FOR RING SYSTOLIC ARRAY ARCHITECTURE FOR NEURAL NETWORKS

FIG. 33

MULTIPLIER CHIP CONTAINS 16 x 16 MULTIPLIERS SUPPORTING
16 VERTICAL AND 16 HORIZONTAL SIGMOID ACTIVATION CHIPS

| SIG INPUT TREE STAGES | # MULTIPLIER CHIPS PER QUADRANT | TOTAL # MULTIPLIER CHIPS IN SYSTEM | N |
|---|---|---|---|
| 1 | 1 | 4 | 32 |
| 2 | 4 | 16 | 64 |
| 4 | 16 | 64 | 128 |
| 6 | 64 | 256 | 256 |
| 8 | 256 | 1024 | 512 |
| 10 | 1024 | 4096 | 1024 |

TABLE 3: EXPANSION OPTIONS

FIG. 34

| NETWORK | HARDWARE | DELAY EQUATION | N | PERFORMANCE EXAMPLE $\delta_A = \delta_{bus} = 1C$ $L=32$ |
|---|---|---|---|---|
| SYSTOLIC RING | N-MULTIPLIERS<br>N-WT STORAGE w/N WTS<br>N-2 to 1 ADDERS<br>N- SIGMOID GENERATORS<br>1-CIRCULAR BUS | $N\delta_M + \delta_A + \delta_S + \delta_{bus}$ | 128<br>512<br>1,024 | $128\delta_M + 2 + \delta_S$<br>$512\delta_M + 2 + \delta_S$<br>$1,024\delta_M + 2 + \delta_S$ |
| SNAP | $N^2$-MULTIPLIERS<br>$2N^2$-WT STORAGE w/2 WTS<br>$2N(N-1)$ COMMUNICATING ADDERS<br>2N-SIGMOID GENERATOR | $\delta_M + 2(\log_2 N)C + \delta_S$ | 128<br>512<br>1,024 | $\delta_M + 14 + \delta_S$<br>$\delta_M + 18 + \delta_S$<br>$\delta_M + 20 + \delta_S$ |
| BIT-SERIAL SNAP | $N^2$-MULTIPLIERS<br>$2N^2$-WT STORAGE w/2 WTS<br>$2N(N-1)$ COMMUNICATING ADDERS<br>2N-SIGMOID GENERATOR | $2(\log_2 N)C + 2(L)C + \delta_S$ | 128<br>512<br>1,024 | $78 + \delta_S$<br>$82 + \delta_S$<br>$84 + \delta_S$ |
| SNAP-ROW PERFORMANCE | #ROWS(N)-MULTIPLIERS<br><br>N(#ROWS) WT STORAGE<br>$N^2/(N(\#ROWS))$ WTS<br>#ROWS(N-1)-DUAL PATH ADDERS<br>N(#ROWS-1)-COMMUNICATING ADDERS<br>N + #ROWS SIGMOID GENERATORS | $r\left(\frac{N}{\#ROWS}\right)\delta_M + 2\log_2(\#ROWS) + 2\delta_{IA} + \delta_S$<br>$r\left(\frac{N}{\#ROWS}\right)\delta_M + 2\log_2 N + \delta_S$ | | |
| T-SNAP | $N^2$-MULTIPLIERS<br>$N^2$-WT STORAGE w/1 WTS<br>$N(N-1)$ COMMUNICATING ADDERS<br>N-SIGMOID GENERATOR | $\delta_M + 2(\log_2 N)C + \delta_S$ | 128<br>512<br>1,024 | $\delta_M + 14 + \delta_S$<br>$\delta_M + 18 + \delta_S$<br>$\delta_M + 20 + \delta_S$ |

FIG.35

| | | | | | | | |
|---|---|---|---|---|---|---|---|
| W11 | W21 | W31 | W41 | W51 | W61 | W71 | W81 |
| W12 | W22 | W32 | W42 | W52 | W62 | W72 | W82 |
| W13 | W23 | W33 | W43 | W53 | W63 | W73 | W83 |
| W14 | W24 | W34 | W44 | W54 | W64 | W74 | W84 |
| W15 | W25 | W35 | W45 | W55 | W65 | W75 | W85 |
| W16 | W26 | W36 | W46 | W56 | W66 | W76 | W86 |
| W17 | W27 | W37 | W47 | W57 | W67 | W77 | W87 |
| W18 | W28 | W38 | W48 | W58 | W68 | W78 | W88 |

W1A*YA  W2A*YA  W3A*YA  W4A*YA  W5A*YA  W6A*YA  W7A*YA  W8A*YA  W9A*YA
WA1*Y1  WA2*Y2  WA3*Y3  WA4*Y4  WA5*Y5  WA6*Y6  WA7*Y7  WA8*Y8  WA9*Y9  WWA*YA

TRIANGULAR SCALABLE NEURAL ARRAY PROCESSOR

CROSS REFERENCE TO RELATED APPLICATIONS

This application is a divisional of application Ser. No. 08/231,853 filed Apr. 22, 1994, U.S. Pat. No. 5,509,106 which is a continuation of application Ser. No. 07/682,786, filed Apr. 8, 1991, now abandoned which is a continuation-in-part of application Ser. No. 07/526,866 filed May 22, 1990, U.S. Pat. No. 5,065,339.

FIELD OF THE INVENTIONS

This invention relates to new and useful improvements in general purpose digital computing systems. More specifically, it relates to a scalable neural network architecture which uses an intercommunication scheme within a scalable array structure for a completely connected network model.

BACKGROUND OF THE INVENTIONS

The neural computing paradigm is characterized as a dynamic and highly parallel computationally intensive system typically consisting of input weight multiplications, product summation, neural state calculations, and complete connectivity among the neurons.

Most artificial neural systems (ANS) in commercial use are modeled on von Neumann computers. This allows the processing algorithms to be easily changed and different network structures implemented, but at a cost of slow execution rates for even the most modestly sized network. As a consequence, some parallel structures supporting neural networks have been developed in which the processing elements emulate the operation of neurons to the extent required by the system model and may deviate from present knowledge of actual neuron functioning to suit the application.

An example of the typical computational tasks required by a neural network processing element may be represented by a subset of the full Parallel Distributed Processing model described by D. E. Rumelhart, J. L. McClelland, and the PDP Research Group, Parallel Distributed Processing Vol. 1: Foundations, Cambridge, Mass., MIT Press, 1986. A network of such processing elements, or neurons, is described in J. J. Hopfield, "neurons With Graded Response Have Collective Computational Properties Like Those of Two-State Neurons," Proceedings of the National Academy of Sciences 81, pp. 3088–3092, May 1984. This processing unit as illustrated in FIG. 1 and Table 1 of FIG. 32.

Referring to FIG. 1, neural network processing unit, or neuron 40, typically includes processing tasks, including input function $I_i$ 44 and activity function $Y_i$ 42, and connectivity network 46, 48 which, in the worst case, connects each such neuron to every other neuron including itself.

Activity function $Y_i$ 42 may be a nonlinear function of the type referred to as a sigmoid function. Other examples of activity function $Y_i$ 42 include threshold functions, probabilistic functions, and so forth. A network of such nonlinear sigmoid processing elements 40 represents a dynamic system which can be simulated on a digital processor. From a mathematical perspective, nonlinear dynamic models of neurons can be digitally simulated by taking the derivative of the nonlinear equations governing the neurons functions with respect to time and then using numerical differentiation techniques to compute the function. This mathematical basis allows mapping the nonlinear continuous functions of neural networks onto digital representations. In discrete time steps, input function $I_i$ multiplies digital weight values $W_{ij}$ by digital signal values, $Y_j$, on each neuron input and then form a sum of these product's digital values. The input to the activity function $Y_i$ is the output $I_i$, and its output, in this case, is activity function $Y_i$ directly; alternatively, the output could be some function $Y_i$.

The accuracy of the nonlinear digital simulation of a neural network depends upon the precision of the weights, neuron values, product, sum of product, and activity values, and the size of the time step utilized for simulation. The precision required for a particular simulation is problem dependent. The time step size can be treated as a multiplication factor incorporated into the activation function. The neurons in a network may all possess the same functions, but this is not required.

Neurons modeled on a neural processor may be simulated in a "direct" and/or a "virtual" implementation. In a direct method, each neuron has a physical processing element (PE) available which may operate simultaneously in parallel with the other neuron PE's active in the system. In a "virtual" implementation, multiple neurons are assigned to individual hardware processing elements (PE's), which requires that a PE's processing be shared across its "virtual" neurons. The performance of the network will be greater under the "direct" approach but most prior art artificial neural systems utilize the "virtual" neuron concept, due architecture and technology limitations.

Two major problems in a "direct" implementation of neural networks are the interconnection network between neurons and the computational speed of a neuron function. First, in an artificial neural system with a large number of neurons (processing units, or PE's), the method of connecting the PE's becomes critical to performance as well as cost. In a physical implementation of such direct systems, complete connectivity is a requirement difficult if not impossible to achieve due to the very large number of interconnection lines required. Second, the neural processing load includes a massive number of parallel computations which must be done for the "weighting" of the input signals to each neuron.

The relatively large size of the neural processing load can be illustrated with respect to a 64×64 element Hopfield network (supra), completely Connected with symmetrical weights. Such a network has 64×64=4,096 neurons which, for a fully interconnected network, has 4096×4096 or approximately 16×10⁶ weight values. A 128×128 element Hopfield network has 128×128 =16,384 neurons with 256× 10⁶ weights. A sum of the weights times neuron input values across all neurons provides the input to each neuron's activation function, such as the sigmoid activation function previously described. Each computation contributes to the overall processing load which must be completed for all neurons every updating cycle of the network.

One structure for implementing neural computers is a ring systolic array. A systolic array is a network of processors which rhythmically compute and pass data through a system. One example of a systolic array for implementing a neural computer is the pipelined array architecture described by S. Y. Kung and J. N. Hwang, "A Unified Systolic Architecture for Artificial Neural Networks," Journal of Parallel and Distributed Computing 6, pp. 358–387, 1989, and illustrated in FIG. 2 and Table 2 of FIG. 33. In this structure each PE 50, 52, 54 is treated as a neuron, labeled $Y_i$. Each neuron contains the weight storage 51, 53, . . . , 55 for that neuron with the weights stored in a circular shifted order which corresponds to the $j^{th}$ neuron values as they are linearly shifted from PE to PE. Assuming the initial neuron values and weights have been preloaded into PEs 50, 52 . . . , 54 from a host, the network update cycle computes the $I_i$ (steps 1 through 7) and $Y_i$ (step 8) values, as shown in Table 2. In this fashion a neural network can be modeled on a systolic array.

The ring systolic array architecture (FIG. 2 and Table 2) has the following performance characteristics assuming overlapped operations:

$$\text{SYSTOLIC RING period} = N\delta_M + \delta_A + \delta_{bus} + \delta_S \quad (1)$$

where the following delay variables are used, representing the delay through each named element:

$\delta_M$=Multiplier delay.

$\delta_A$=Communicating Adder: 2-1 add stage delay.

$\delta_S$=Sigmoid generator delay.

$\delta_{bus}$=bus Communicating Adder: communications bypass stage delay.

and N represents the total number of neurons.

It is an object of this invention to provide an improved array processor apparatus and method.

It is a further object of this invention to provide an improved neural system architecture and method.

It is a further object of this invention to provide an artificial neural system which provides improved direct modeling of large neural networks.

It is a further object of this invention to provide an improved interconnection network for simplifying the physical complexity of a neural array characterized by total connectivity.

It is a further object of this invention to provide an improved neural array architecture and method adapted for efficient distribution over a plurality of interconnected semiconductor chips.

SUMMARY OF THE INVENTION

In accordance with the apparatus of the SNAP (scalable neural array processor) inventions, an array processor comprises a plurality of input function elements, with each input function element selectively allocated to a set of neurons, and each neuron including means for generating a neuron value from a selected set of input function elements and for communicating said neuron value back to said selected set of input function elements.

In accordance with the apparatus and method of those inventions, the total connectivity of each neuron to all neurons, including itself, is accomplished by an orthogonal relationship of neurons: that is, a given multiplier element operates during a first cycle as a row element within an input function to a column neuron, and during a second cycle as a column element within an input function to a row neuron.

In accordance with the method of the SNAP inventions, an array processor comprising orthogonal sets of neurons and a plurality of input function elements, is operated according to the method comprising the steps of (1) operating a first neuron upon a first subset of said input functions to generate and load back into said first subset a neuron value, and (2) allocating each of said first subset of input function elements to one of a set of orthogonal neurons.

In this applications and in accordance with the preferred embodiment of the SNAP inventions which we denominate T-SNAP, the triangular scalable neural array processor unit has a N neuron structure, having multipliers, communicating adder trees; and neuron activation functions, and a reverse or feed back loop for communicating the output of a neuron activation function back to input multipliers of selected neurons. It should be realized that both SNAP and T-SNAP are distinct approaches.

In the SNAP embodiment of the inventions, there is an array of weight registers arranged in an i-column/j-row array or matrix with $N^2$ weights contained in the structure. In this application's preferred Triangular SNAP (T-SNAP) structure there is a weight matrix assembly, enabling a diagonal folded matrix to place symmetric weights together.

In the Triangular scalable neural array processor there are only $N^2$ multipliers, N communicating adder trees, and N neuron activation functions for a neuron structure.

In the T-SNAP unit each neuron structure is provided with a general cell structure having weight registers and value registers as input elements providing weights and/or values to the structure, and the structure is interconnected to perform within a period, multiplication of values and weights provided to the neuron structure, summation of multiplied products of values by weights, generation of new neuron values through a sigmoid generator or other neuron activation function, and communication of the neuron values generated through said sigmoid generator to neuron inputs means of said N neuron structure.

The arrangement of each general cell allows a summation in one direction when a cell is so enabled, which cell also allows it, when disabled, to act as a communication path in a reverse direction, and so neuron values can be generated with sigmoid generators elements to produce $Y_i$ values, and providing $Y_i$(prime) values at the sigmoid outputs, and the cell when reversing the enable-disable state permits the communication of the neuron values $Y_i$'s back to be received in a specified multiplier input register, with said multiplier input register indicating that the Y value register has been updated.

T-SNAP provides a neuron with a general cell comprising a weight register, a value register and a multiplier, which can have several functions. Such a general cell can be a diagonal cell formed for multiplying a stored weight, contained by said weight register, by a Y value, contained by said value register, and for supplying the multiplied result to the adder tree. Furthermore, as the diagonal structure allows, the diagonal cell allows a reverse communications mode enabling the cell to receive a Y value from an attached add tree for storing in the cell's Y value register.

The concept of a general cell each comprising a weight register, a value register and a multiplier, is used to provide one of the general cells to function as a top cell and another of said cells to function as a bottom cell, each supplying a weight by value multiplication result value to an attached add tree of the structure, and in a reverse communication mode a $Y_j$ value received from a bottom cell multiplier add tree can be stored into the top cell Y value register and likewise a $Y_i$ value received from the top cell multiplier add tree can be stored into the bottom cell Y value register so as to switch the storing of Y values received from the cell's tree source points.

Besides using less hardware than the SNAP structure, the T-SNAP structure is expanded by adding rows to the matrix with each additional row being longer than the previous row of the neuron structure. The summation tree provided is such that the tree has a plurality of add trees and the structure being such that the longest adder tree path is the controlling path.

The advantages of the T-SNAP structure is that processing provides the same results as SNAP with less hardware and easier expandability. However it should be appreciated that a system which employs the units will accomplish the advantages of total connectivity, while not having all of the concomitant problems resulting from earlier structures. With these inventions, the neurons are connected, but they are connected via a tree structure that is also used for neural computations, allowing for a simple organization and still achieving all of the requirements of a neural network.

BRIEF DESCRIPTION OF THE DRAWINGS

The above and other objects, features and advantages of the invention will be more fully appreciated with reference to the accompanying FIGURES, in which:

FIG. 18A and 18B are schematic representation of a multiplier quadrant of a sixteen neuron matrix.

FIG. 19A and 19B are schematic representation of a physical layout structure for the packaging and wiring of a neuron matrix having multiplier array chips and neuron activation function chips.

FIGS. 20A and 20El are symbolic and schematic representations of an embodiment of the neuron activation function chips of the neuron matrix of FIG. 19.

FIG. 32 is a Table for the processing unit as illustrated in FIG. 1.

FIG. 33 shows a Table 2 for neural computer with pipelined array architecture as illustrated in FIG. 2.

FIG. 34 shows Table 3 and the four factor expansion relationship.

FIG. 35 shows Table 4 provides an architecture comparison summary, a summary performance evaluation and comparison with alternate architectures is set forth, including hardware cost and performance comparison between the SNAP, BIT SERIAL SNAP, and SNAP ROW architectures of the invention, and the SYSTOLIC RING architecture of the prior art, and finally compares the other performance to T-SNAP.

FIG. 36 shows an example of a weight matrix for an eight neuron assembly for T-SNAP application.

FIG. 37 shows the weight matrix of FIG. 36 folded along the diagonal:

FIG. 38 adds the neuron Y values associated with the weights of FIG. 37.

FIG. 40A, is associated with the diagonal elements, $W_{ii} \times Y_i$, and the second "cell", which we call a G-CELL, illustrated by FIG. 40B, is associated with the rest of the elements of the folded matrix structure of FIG. 39 (and contains two elements placed in the "cell" shown in a top and bottom arrangement.

FIG. 43 presents a ten neuron T-SNAP which was created from an eight neuron structure by adding two new rows to the original eight neuron assembly.

DESCRIPTION OF THE PREFERRED EMBODIMENTS

Figure 1:
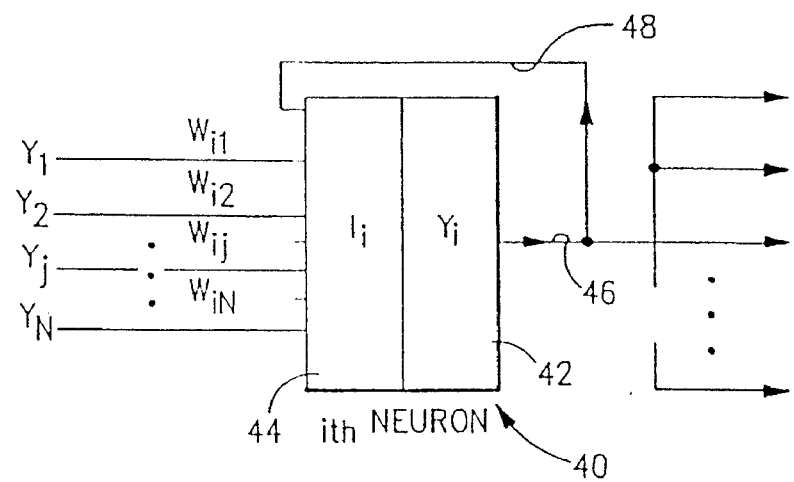
FIG. 1 is a schematic representation of a typical neuron function.
Figure 2:
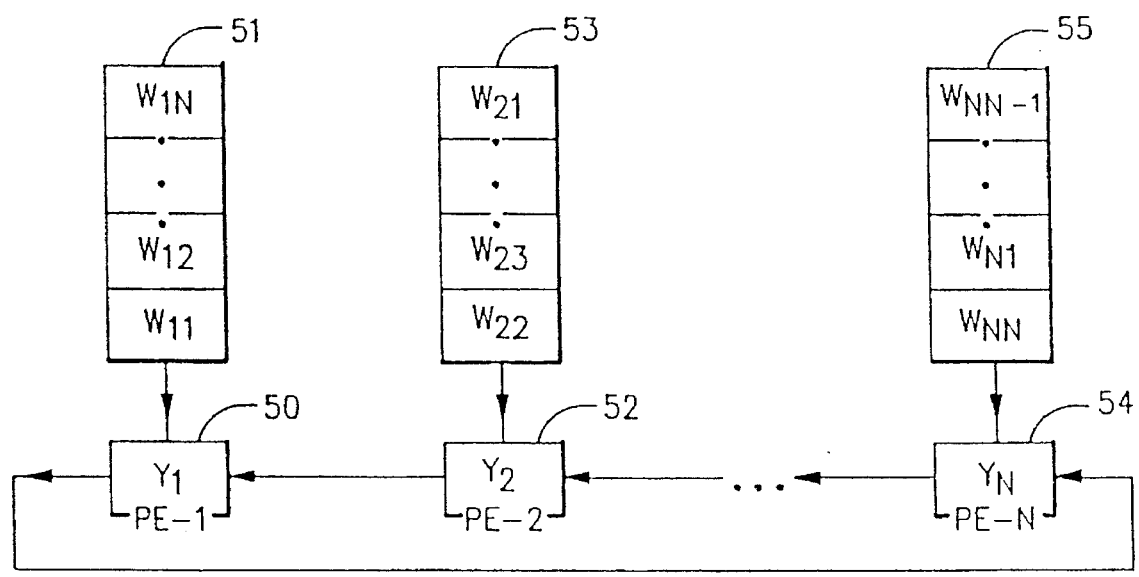
FIG. 2 is a schematic representation of a prior art ring systolic array.

This invention relates to a neural processor including orthogonal sets of neuron elements and provision for transporting neuron values between elements. A neuron comprises (1) an input function, typically a set of input function elements, or multiplier elements each responsive to an input value and a weight value to provide a weighted output, (2) a combination or reduction function, typically an adder tree for combining the weighted outputs from the multiplier elements into a single value, and (3) an activation function responsive to the single value for generating the neuron output. In the worst case, of total connectivity, each of the neurons in an N×N array of neurons is connected to communicate its neuron output as an input value to all neurons, including itself—and thus would have a set of N multiplier elements at its input function. In accordance with a preferred embodiment of this invention, the combination function includes a reverse communication path for communicating the neuron output back just to its own input function. Alternatively, a separate communication path may be provided. The total connectivity of each neuron to all neurons, including itself, is accomplished by the orthogonal relationship of neurons: that is, a given multiplier element operates during a first cycle as a row element within an input function to a column neuron, and during a second cycle as a column element within an input function to a row neuron.

The four basic operations generally implemented by a neural computer simulating a completely connected N neuron network are:

1. $N^2$ Multiplications
2. N Product Summations
3. N Activation Functions
4. N×N Communications As will be hereafter described, in accordance with a preferred embodiment of the invention, the architecture of a scalable neural array processor (also referred to as SNAP) provides the $N^2$ multiplications by utilizing $N^2$ multipliers, the N product summations by tree structures, the N activation functions by utilizing separate activation function modules, and the N×N communications by a reverse path mechanism included within adder tree structures.

In connection with preferred embodiments of the invention hereinafter described, the function implemented by the neural processor is:

$$Y_i = F\left( \sum_{j=1}^{N} Y_j W_{ij} \right) \quad (2)$$

Where: N is the number of neurons, F(x) is the neuron activation function which is set equal to a sigmoid activation function whose form can be:

$$F(x) = 1/1 + e^{-Kx}$$

And Where: The subscripts on the weights W such as $W_{13}$ represent the weight of the connection between neurons, in this example from Neuron 3 to Neuron 1.

Other examples of neuron activation functions include threshold functions, probabilistic functions, and so forth.

In the embodiments of the invention to be hereafter described, it is assumed that the weights are fixed for the duration of the network execution. However, as these weights are loadable from a host computer, learning algorithms may be implemented at the host and weight updating provided. Further, referring to FIG. 21, in the preferred embodiments of the invention to be hereafter described, host computer 30 also initializes network 32 architectures by (1) loading (a) the number of neurons in the network to be simulated by the architecture, (b) all the connection weights, (c) the initial neuron values, and (d) the number of network update cycles to be run, (2) starting the model into execution, and (3) reading the neuron values at the completion of network execution.

Hereafter, in assessing and comparing the performance of various neural processing architectures, only performance during execution is considered, and not the initialization time and the host processing time.

In accordance with a preferred embodiment of the invention, a multiplier and adder tree array structure to be described provides a means for transporting neuron values between the neuron elements. The interpretation of equation (2) for this embodiment of SNAP is based on noting that for each neuron i there is a weight multiplication with the same $Y_j$ input but with different weights. This is seen by expanding equation (2) for each neuron value and comparing the equations for the multiple neuron outputs. For example, the N neuron outputs formed from equation (2) are as follows:

$$Y_1 = F(W_{11}Y_1 + W_{12}Y_2 + \ldots + W_{1N}Y_N)$$
$$Y_2 = F(W_{21}Y_1 + W_{22}Y_2 + \ldots + W_{2N}Y_N)$$
$$\vdots$$
$$Y_N = F(W_{N1}Y_1 + W_{N2}Y_2 + \ldots + W_{NN}Y_N)$$

Figure 3:
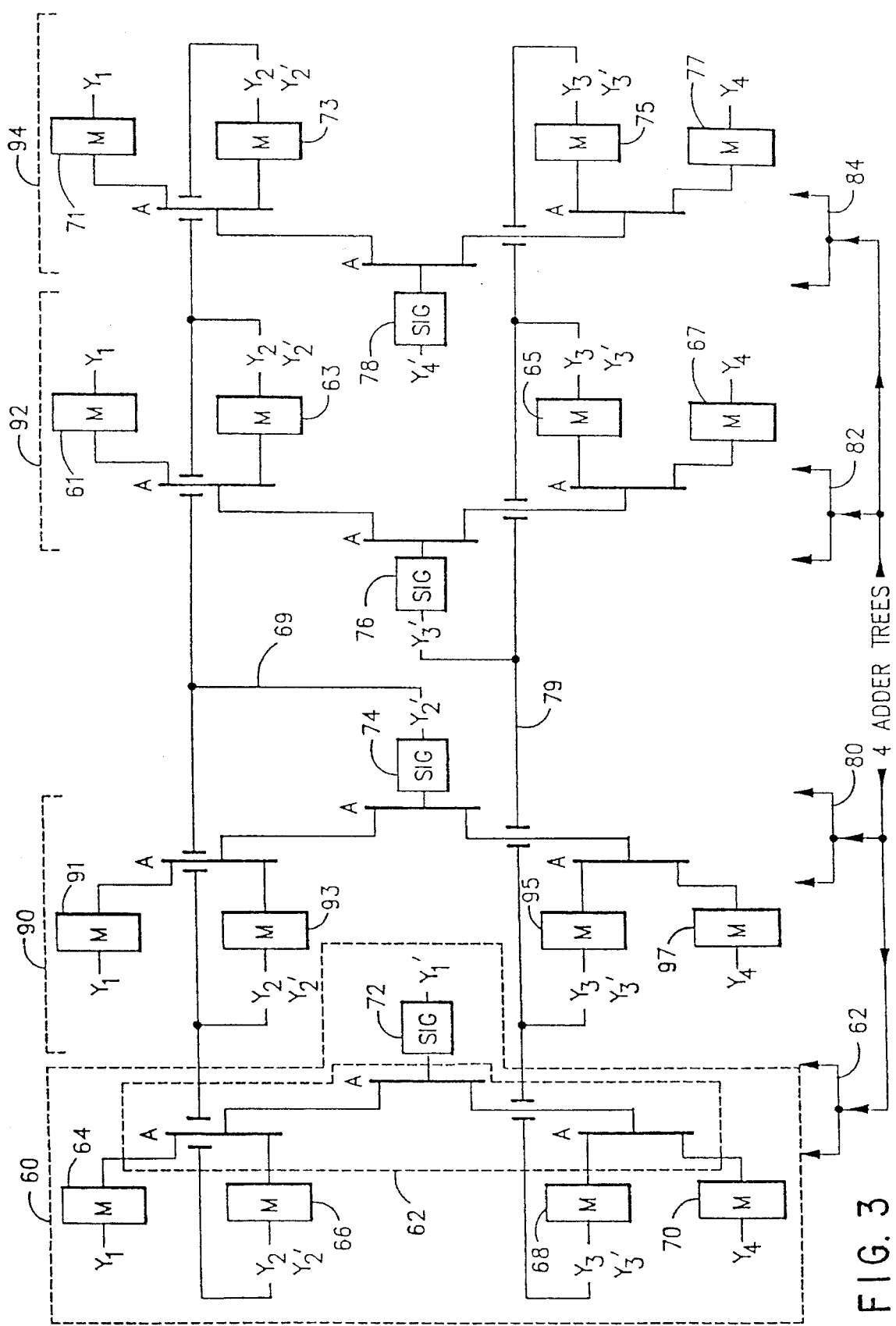
FIG. 3 is a schematic representation of a four neuron array illustrating total connectivity.

Referring to FIG. 3, as an example, a four (N=4) neuron array with $N^2$ interconnections is shown, illustrating the principle of total connectivity (and the almost impossibility of physically realizing an N neuron matrix as N becomes much larger.) Herein, neuron 60 comprises adder tree 62, multipliers 64, 66, 68, 70, and sigmoid generator 72. This neuron structure is replicated, forming three more neurons 90, 92, 94, in which sigmoid generators 74, 76, 78 are associated with adder trees 80, 82, 84, respectively, and multiplier circuits 91, 93, 95, 97, 61, 63, 65, 67, 71, 73, 75, 77, as shown. The output value $Y_2'$ from sigmoid generator 74 of neuron 90 is fed back (that is, interconnected by data paths 69) to the inputs to multipliers 66, 93, 63, and 73, which form the second row of a four by four multiplier matrix. The output value $Y_3'$ from sigmoid generator 76 of neuron 92 is fed back (interconnected by data paths 79) to the inputs to multipliers 68, 95, 65, and 75, which form the third row of the four by four multiplier matrix. While not shown, the outputs $Y_1'$ and $Y_4'$ of sigmoid generators 72 and 78 of neurons 60 and 94, respectively, are fed back (interconnected) to the inputs of multipliers 64, 91, 61, and 71 forming the first row of the multiplier matrix, and to multipliers 70, 97, 67, and 77 forming the fourth row of the matrix, respectively. Herein, the weights and neuron values are represented by some arbitrary number of bits on the data communication paths reflecting the precision of the value, for example a 16 or 32 bit representation, and these values can be produced and communicated in parallel or serial fashion.

Assuming the $Y_j$ inputs (such as $Y_1$, $Y_2$, $Y_3$, $Y_4$) and their associated weights are separately available and there are N separate parallel multipliers (such as multipliers 64, 66, 68, 70) then for a given neuron "i" (such as neuron 60), N products can be formed in parallel (at the outputs of multipliers 64, 66, 68, 70) in one multiplier delay time. These N products are then added together using 2 to 1 adders arranged in a tree structure (such as adder tree 62) to form a final summation X which is passed to the F(X) unit (such as sigmoid generator 72) to produce the $i^{th}$ neuron output (such as $Y_1'$). With N neurons (such as 60, 90, 92, 94) of this type, N neuron values (such as interconnected neuron values $Y_1'$, $Y_2'$, $Y_3'$, $Y_4'$) can be produced.

As the output of each neuron is interconnected to the input of all other neurons in the matrix, including itself, the N neurons 60, 90, 92, 94 of FIG. 3 require $N^2$ connections 69, 79, ..., which, as N increases, is difficult if not impossible to physically realize.

In accordance with the present invention, in order to achieve the completely interconnected structure in SNAP, as required by equation (2) but without the difficulties presented by the interconnection scheme set forth in FIG. 3, a novel method of transporting the neuron values is provided. This is accomplished through the use in a matrix of octogonal neurons (to be hereinafter described in connection with the four neuron SNAP of FIG. 7) of the SNAP adder tree of FIGS. 4A, 4B, the SNAP multiplier of FIGS. 5A, 5B, and the SNAP sigmoid generator of FIGS. 6A, 6B. Herein, a pair of neuron's are orthogonal if they time share an input function element. Other interconnection networks can be utilized provided they have the attribute of reducing a plurality of inputs to one value, which value is communicated back to the inputs, as is described hereafter in the SNAP adder tree example of FIGS. 4A, 4B.

Figures 4A, 4B:
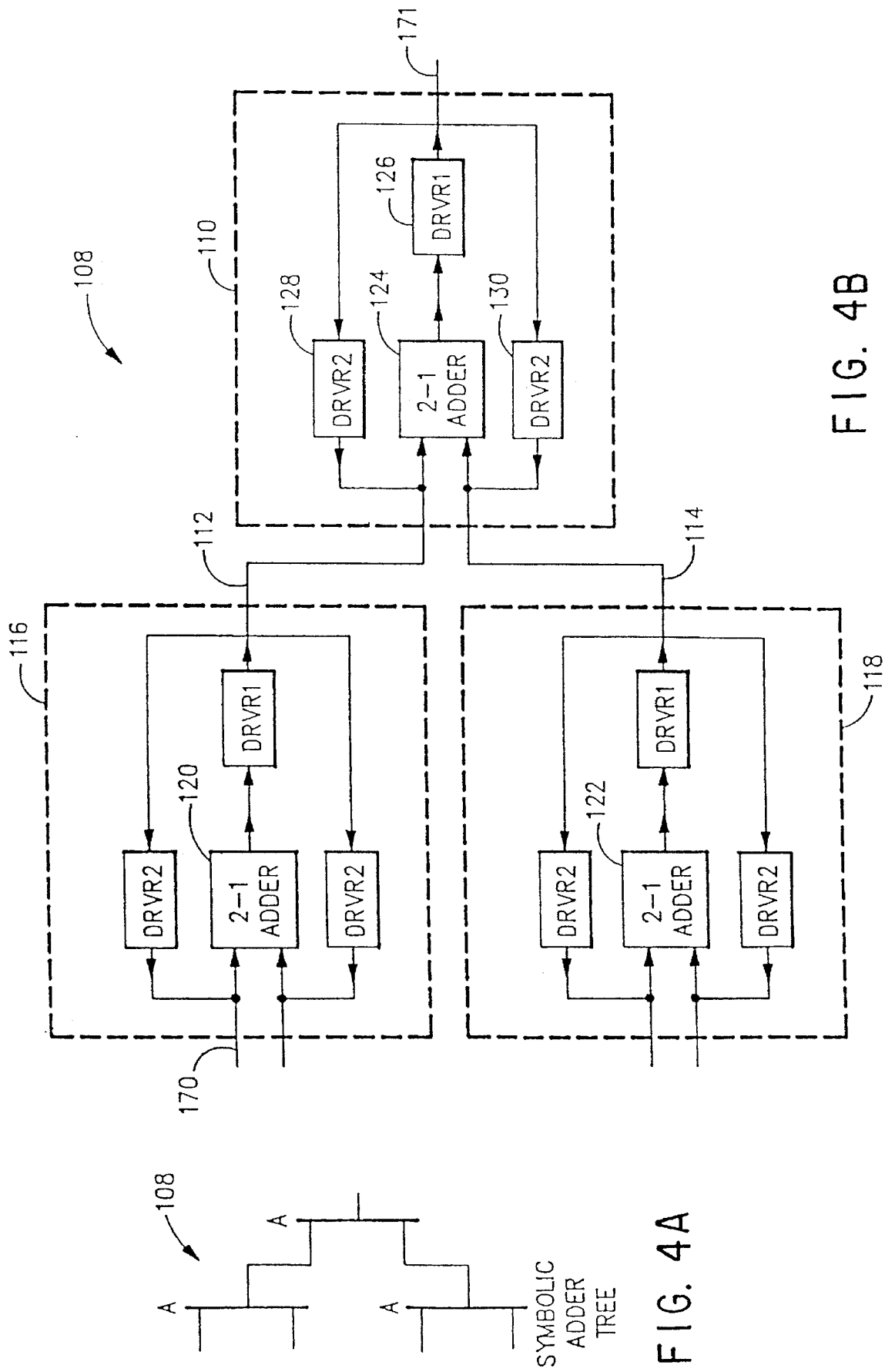
FIGS. 4A add 4B are symbolic and schematic representations of a communicating adder designed according to the invention.

Referring to FIG. 4A, a symbolic representation of the adder tree 108 of the invention is provided, with the 2-1' adders designated by the letter A.

Referring to FIG. 4B, the more detailed representation of the adder tree 108 of the SNAP is shown. Three SNAP 2-1 adder elements 120, 122, 124 are shown in a 2 stage pipelined tree arrangement. Output stage 110 2-1 adder element 124 has Driver-1, DRVR1, block 126 on its output and two Driver-2, DRVR2, blocks 128, 130 bypassing adder 124, but in a reverse direction. Drivers 126, 128, 130 are responsive to enable/disable signals (generated by state control 34 of FIG. 21) which, when in the disable state, keeps the driver output in a high impedance state and when in the enable state turns the driver into a non-inverting buffer. When DRVR1 block 126 is enabled DRVR2 blocks 128, 130 are disabled and visa versa. This structure is replicated at the input stage, with both input adders 116, 118 having outputs 112, 114, respectively, forming the inputs to output stage 110. In this manner the adder tree can provide the summation function in one direction, DRVRI's enabled—DRVR2's disabled, while essentially acting as a communication path in the reverse direction, DRVRI's disabled—DRVR2's enabled. Alternatively, a separate reverse communication path can be utilized, as hereinafter described in connection with FIG. 24. Also, pipeline latches (not shown) would generally be provided on the inputs to the adders.

An adder tree (such as 108) using 2 to 1 adders (such as adders 120, 122, 124) will require $\log_2 N$ adder stages. It should be noted that SNAP's communicating adder 108 represents its logical function since, for example, depending upon technology, the DRVR1 126 function could be incorporated in the gate devices required by each of adders 110, 116, 118 thereby adding no additional delay to the add function. Alternatively, and in the general sense, the forward summation and reverse communication path may be implemented with 2 to 1, 3 to 1 , ..., N to 1 adders, or combinations thereof. Also, in the general sense, the summation function may be any function (Boolean or arithmetic, or combination thereof) which converges a plurality of inputs to an output value.

Figure 5A:
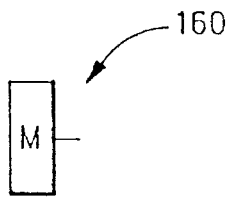
FIGS. 5A and 5B are symbolic and schematic representations of multiplier designed according to the invention.
Figure 5B:
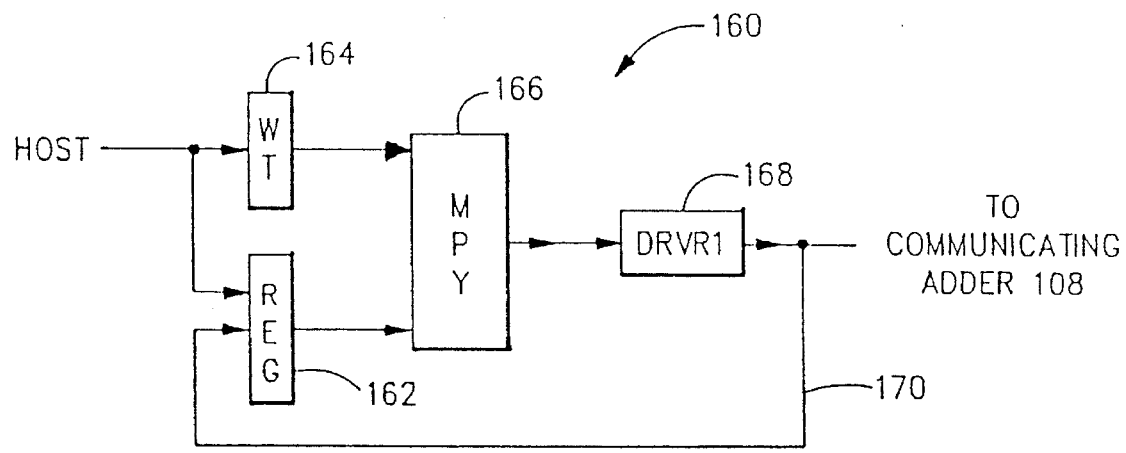

Referring to FIGS. 5A and 5B, SNAP's multiplier 160 is designed to work with communicating adder 108. Storage is provided in register 162 for the neuron values and in register 164 for their associated weights. The Equation (2) $Y_j$ and $W_{ij}$ values, or operands, are initialized from the HOST computer into registers 162, 164, respectively, and are inputs to multiplier 166. The $Y_j$ values in register 162 after initialization are received from the communicating adder along path 170 when it is in communicating mode; that is, DRVR1s 126, 168, ..., disabled and DRVR2s 128, 130, ..., enabled. While block 166 is here shown as a multiplier, the invention is not so restricted, and alternative functions may therein be provided for generating an output function to driver 168 within the scope of the invention.

Figure 6A:
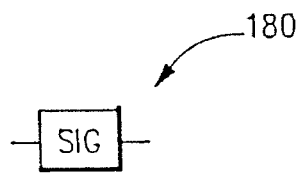
FIGS. 6A and 6B are symbolic and schematic representations of an activity function generator (herein, a sigmoid generator) designed according to the invention.
Figure 6B:
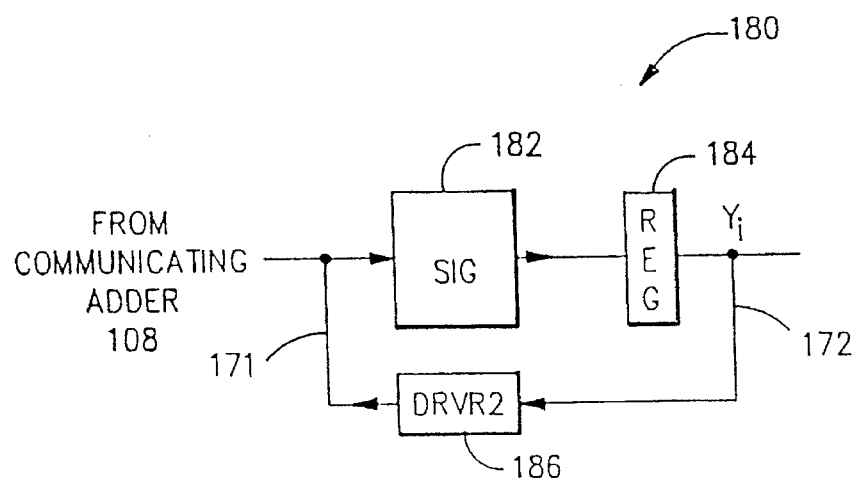

Referring to FIGS. 6A and 6B, SNAP sigmoid generator 180 also works with communicating adder 108 by first calculating in generator block 182 and storing in register 184 the neuron value $Y_i$ from the summation of weighted inputs, DRVR1s enabled—DRVR2s disabled and second by passing the generated neuron Y value in reverse fashion, DRVR1 s disabled—DRVR2s enabled, back through adder 108 to be received by multiplier 160. As previously noted, functions other than a sigmoid function may be implemented in activation function block 180 without departing from the spirit of the invention.

Figure 7:
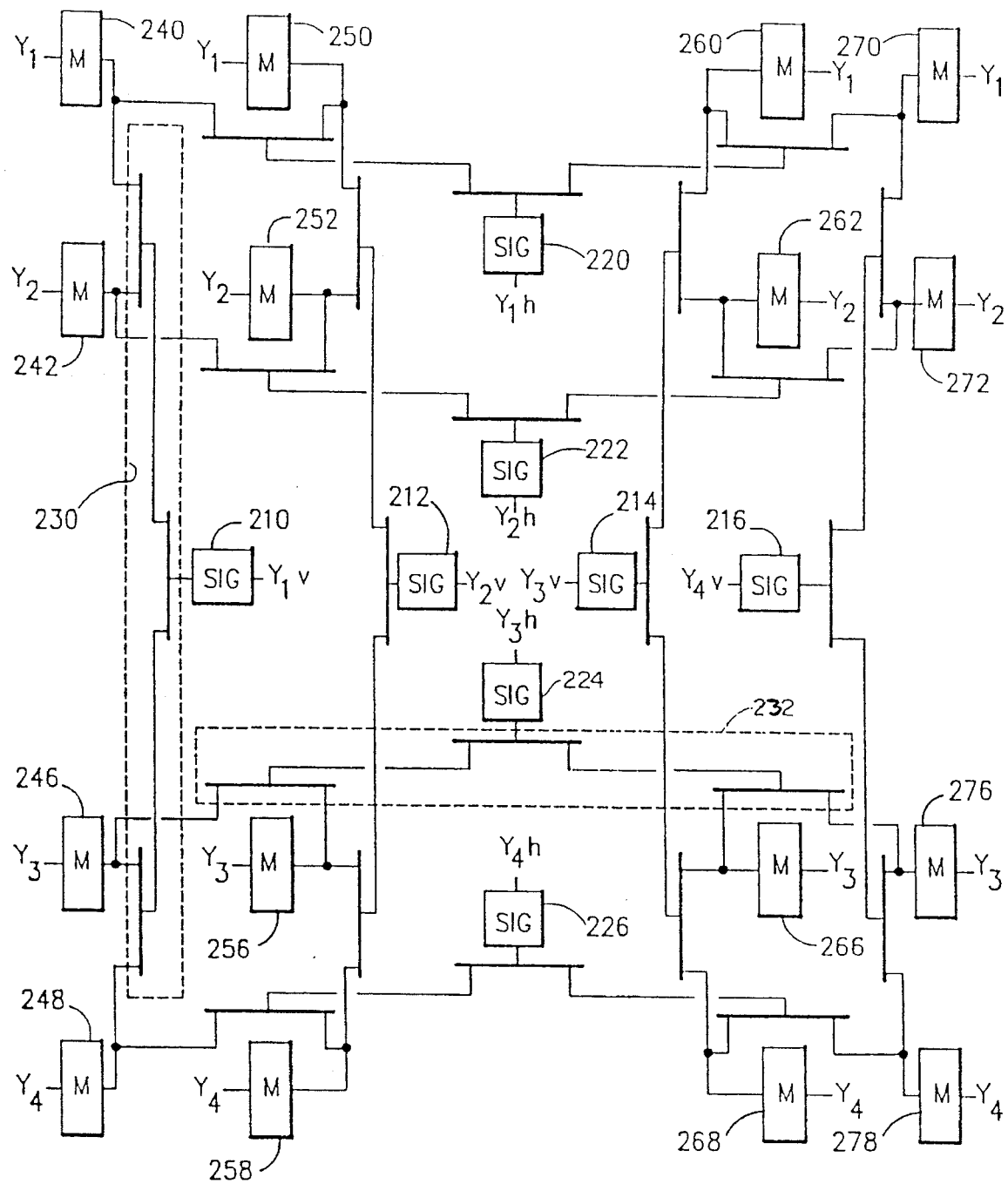
FIG. 7 is a schematic representation illustrating the interconnection of communicating adders, multipliers, and sigmoid generators to form a four neuron matrix.

Referring now to FIG. 7, a four neuron SNAP matrix in accordance with a preferred embodiment of the invention is set forth. In the embodiment of FIG. 7, the arrangement of FIG. 3 is modified by a structure in addition to those of FIGS. 4 through 6 in order to make use of the communication path of this embodiment of the invention through the adder tree. This additional structure is another set of N communicating adder trees (one being represented by adder tree 232) with sigmoid generators 220, 222, 224, 226 placed orthogonal to a first set 210, 212, 214, 216. FIG. 7 shows these additional N structures in a 4 neuron SNAP. The added horizontal structures, or row sections, including communicating adder trees 232, etc., and activation, or sigmoid, generators 220, 222, 224, 226 are exactly the same as the vertical structures previously described in connection with FIGS. 4, 5, and 6, with the exception that there are new driver enable/disable signals (not shown) required for the row sections. In FIGS. 7 thru 15, for simplicity in explanation, the vertical column adder trees (such as adder 230) and associated sigmoid generator (such as sigmoid generator 210) are labeled with a lower case "v", for vertical, while the horizontal adder trees (such as 232) and their associated sigmoid generators (such as 224) are labeled with a lower case "h", for horizontal. Similarly, references to drivers DRVR1 and DRVR2 associated with vertical adder trees and corresponding sigmoid generators (even though not specifically shown in FIGS. 7–15) will be identified with a lower case "v". Similarly, drivers associated with horizontal trees and generators are identified by lower case "h". Herein, each input function block, such as multiplier 246, is associated with orthogonal neurons: that is, allocated in a time shared manner to one vertical neuron 230 and one horizontal neuron 232, in a manner now to be described.

Referring now to FIGS. 8 thru 15, a description of several states of the four neuron SNAP of FIG. 7 are presented for two cycles of update operation in accordance with a preferred embodiment of the method of the invention. In each of FIGS. 8 thru 15, asterisks are used to illustrate the function being performed in the respective process steps or states. The matrices of FIGS. 8 through 15 correspond to FIG. 7, simplified by not including the data path lines, with horizontal adder tree 232 (and, similarly, adder trees 286, 288 and 290) represented by horizontal bars, and vertical adder tree 230 (and, similarly, adder trees 280, 282 and 284) represented by vertical bars. For clarity of explanation, in FIGS. 9 through 15, selected active elements are identified by reference numerals.

Figure 8:
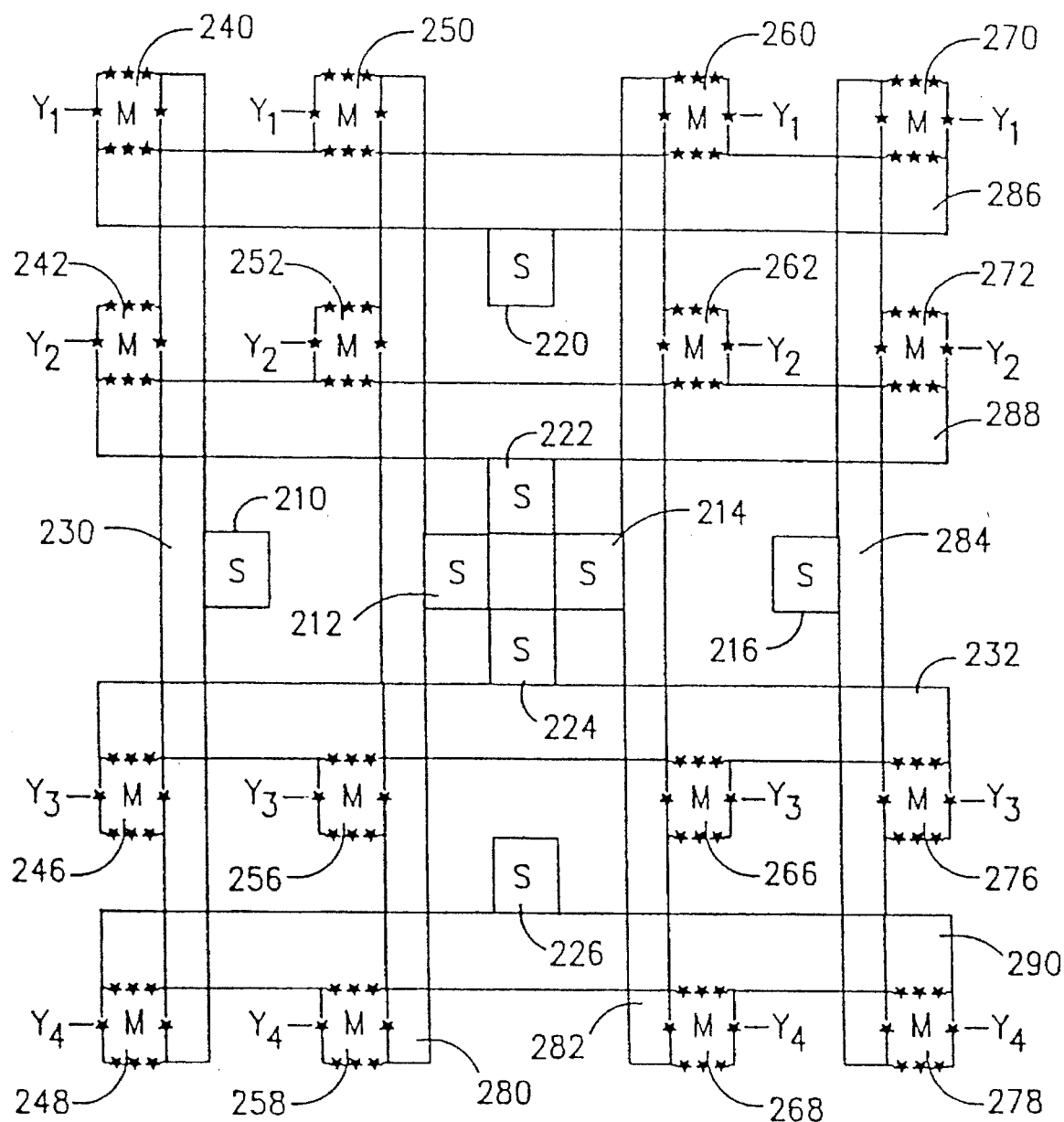
FIGS. 8, 9, 10, 11, 12, 13, 14 and 15 are a schematic representation showing the states of selected elements of the four neuron matrix of FIG. 7 through two neuron update cycles of operation.

The matrix of FIGS. 7 and 8 is initialized, herein, by the host loading the weights (FIGS. 1 and 5B) and first neuron values $Y_1, Y_2, Y_3, Y_4$ into the multiplier registers 162, 164 (FIG. 5B) of each column. Thereafter, the SNAP structure of the invention operates as follows.

Step 1: MULTIPLY. Referring to FIG. 8, neuron values $Y_i$ are multiplied by weights $W_{ij}$ in parallel in multipliers 240, 242, ..., 250, ..., 278.

Figure 9:
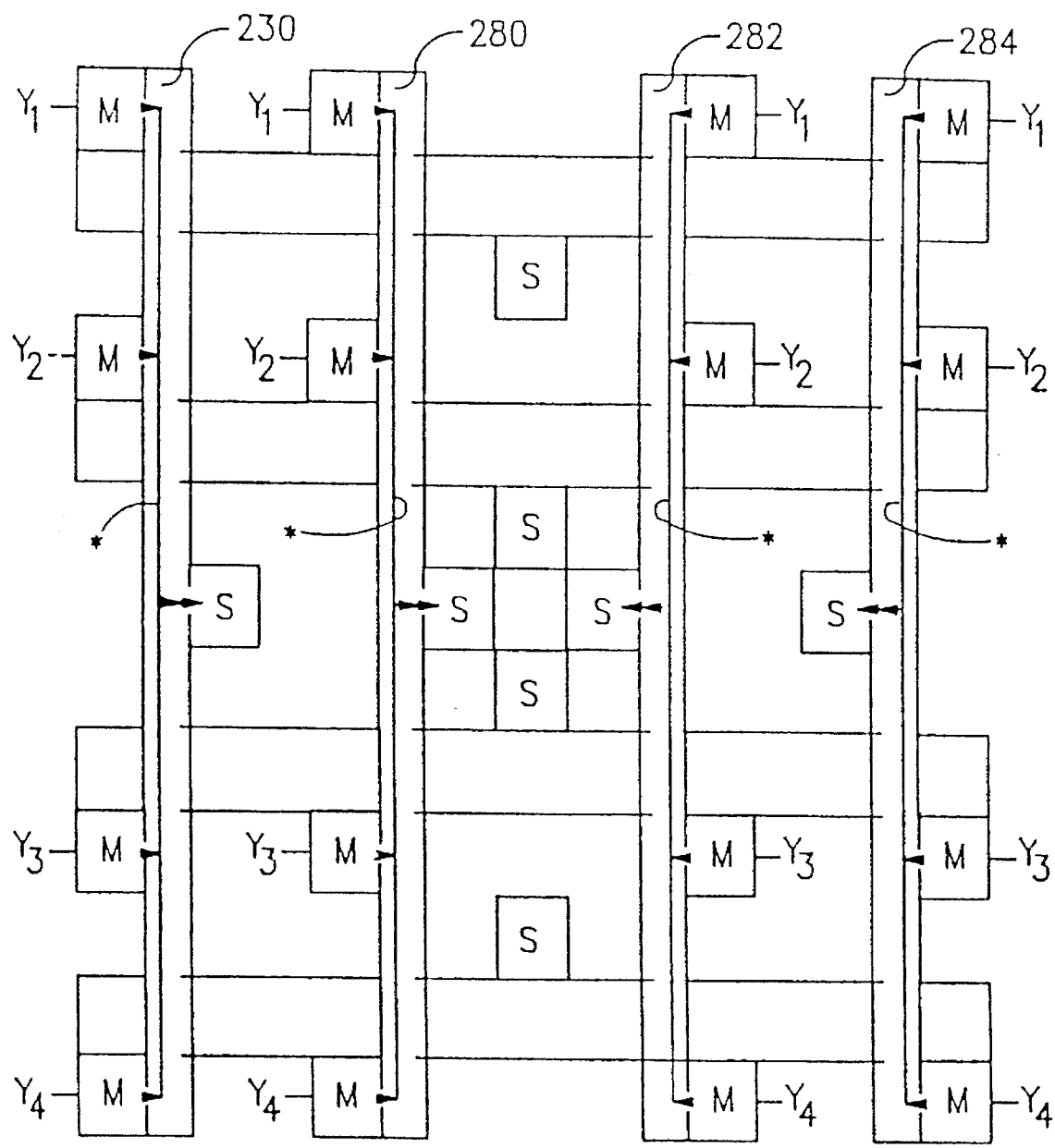

Step 2: VERTICAL FORWARD. Referring to FIG. 9, vertical column adder trees 230, 280, 282, 284 are operated with DRVR1vs enabled, and DRVR2vs, DRVR1hs and DRVR2hs disabled to combine, herein provide the summation, of the weighted neuron values. (In this description of FIGS. 7 thru 15, the "s", such as is used in "DRVR1vs", designates the plural.)

Figure 10:
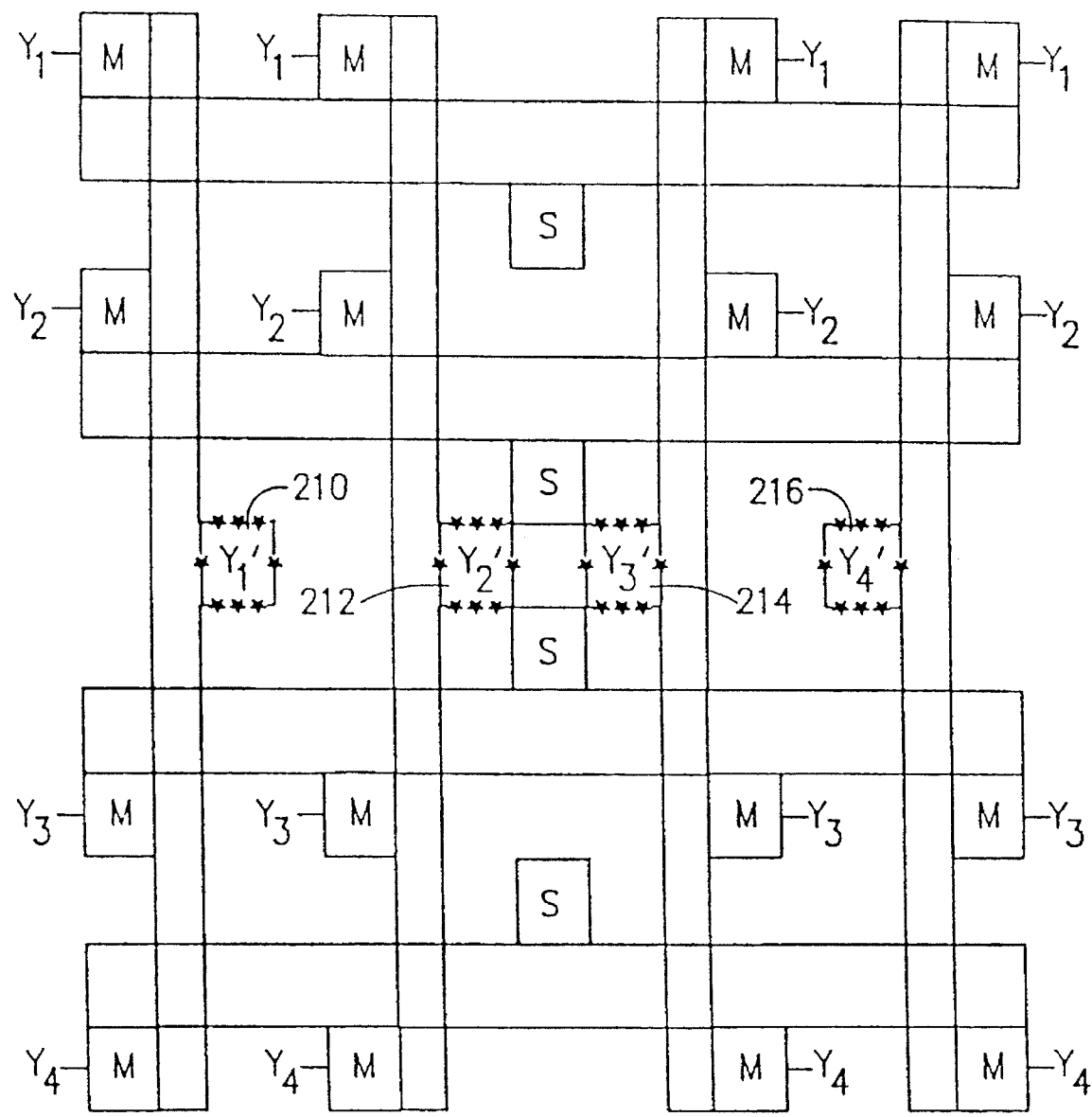
Figure 11:
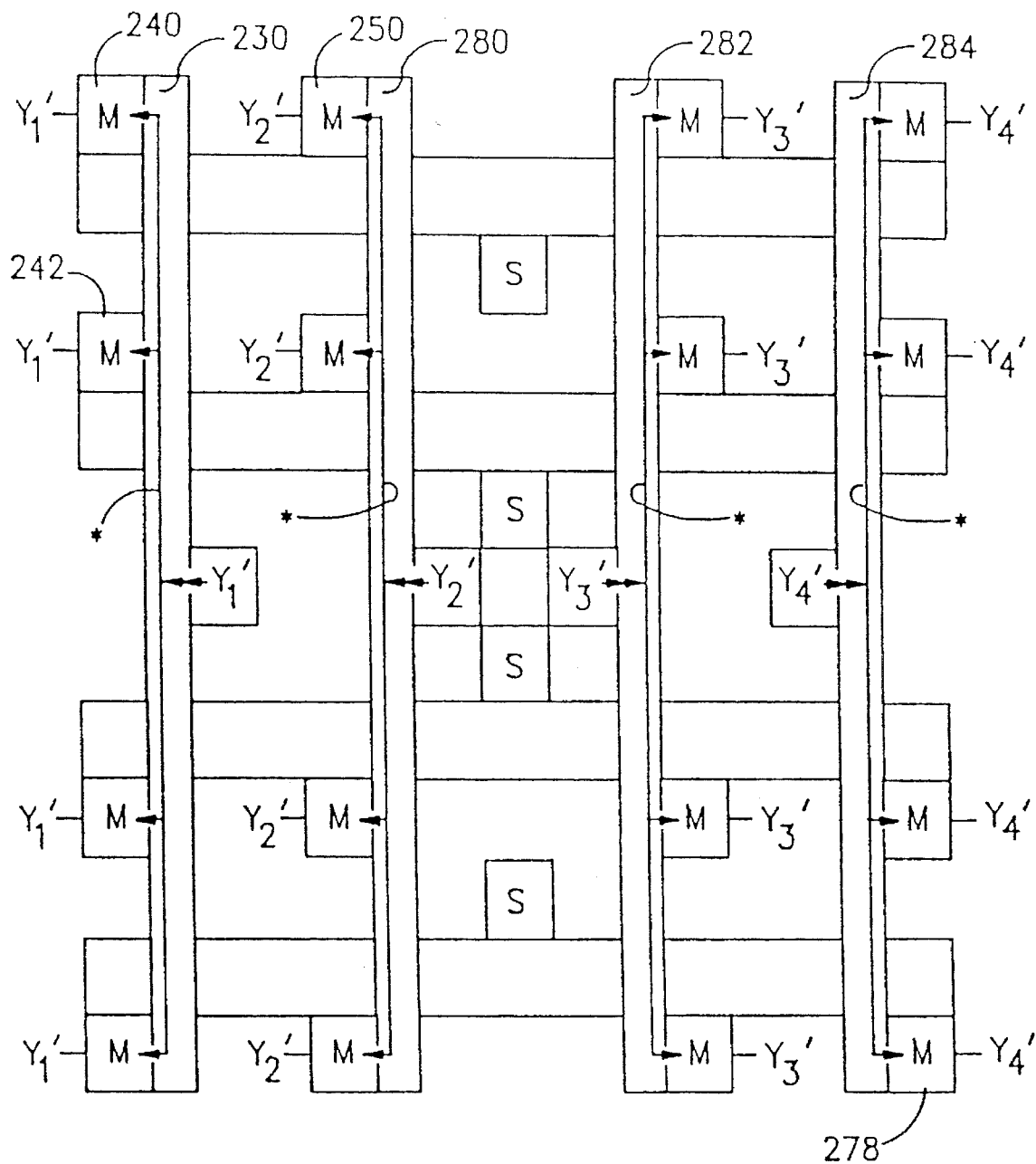

Step 3: GENERATE VERTICAL. Referring to FIG. 10, vertical activation functions, herein sigmoid generators 210, 212,214, 216 produce the vertical neuron values, $Y_i$vs: $Y_1'$, $Y_2'$, Step 4: VERTICAL REVERSE. Referring to FIG. 11, vertical adder trees 230, 280, 282, 284 are operated with DRVR2vs enabled, and DRVR1vs, DRVR1hs, and DRVR2hs disabled to communicate the $Y_i$vs back to the input registers 162 (FIG. 5B) of multipliers 240, 242, ..., 250, ..., 278.

This completes the first update cycle, such that the input values $Y_1$, $Y_2$, $Y_3$, $Y_4$ initialized down the columns have been modified and positioned across the rows of the matrix as values $Y_1'$, $Y_2'$, YE', $Y_4'$, respectively.

Figure 12:
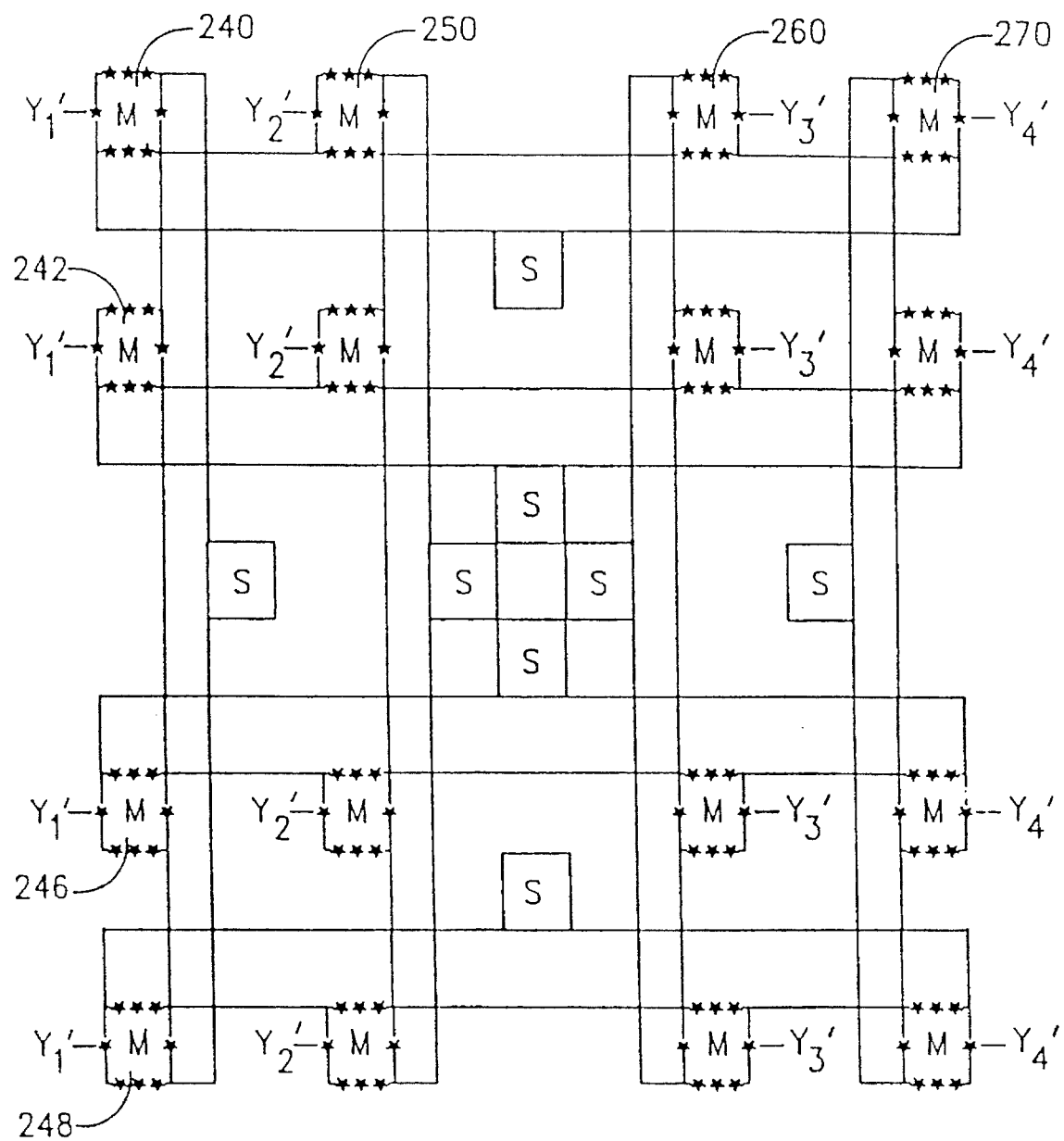

Step 5: MULTIPLY VERTICAL. Referring to FIG. 12 in connection with FIG. 5B, vertical neuron values $Y_i$v (in registers 162) are multiplied (multiplier 166) by weights $W_{ij}$ (in registers 164).

Figure 13:
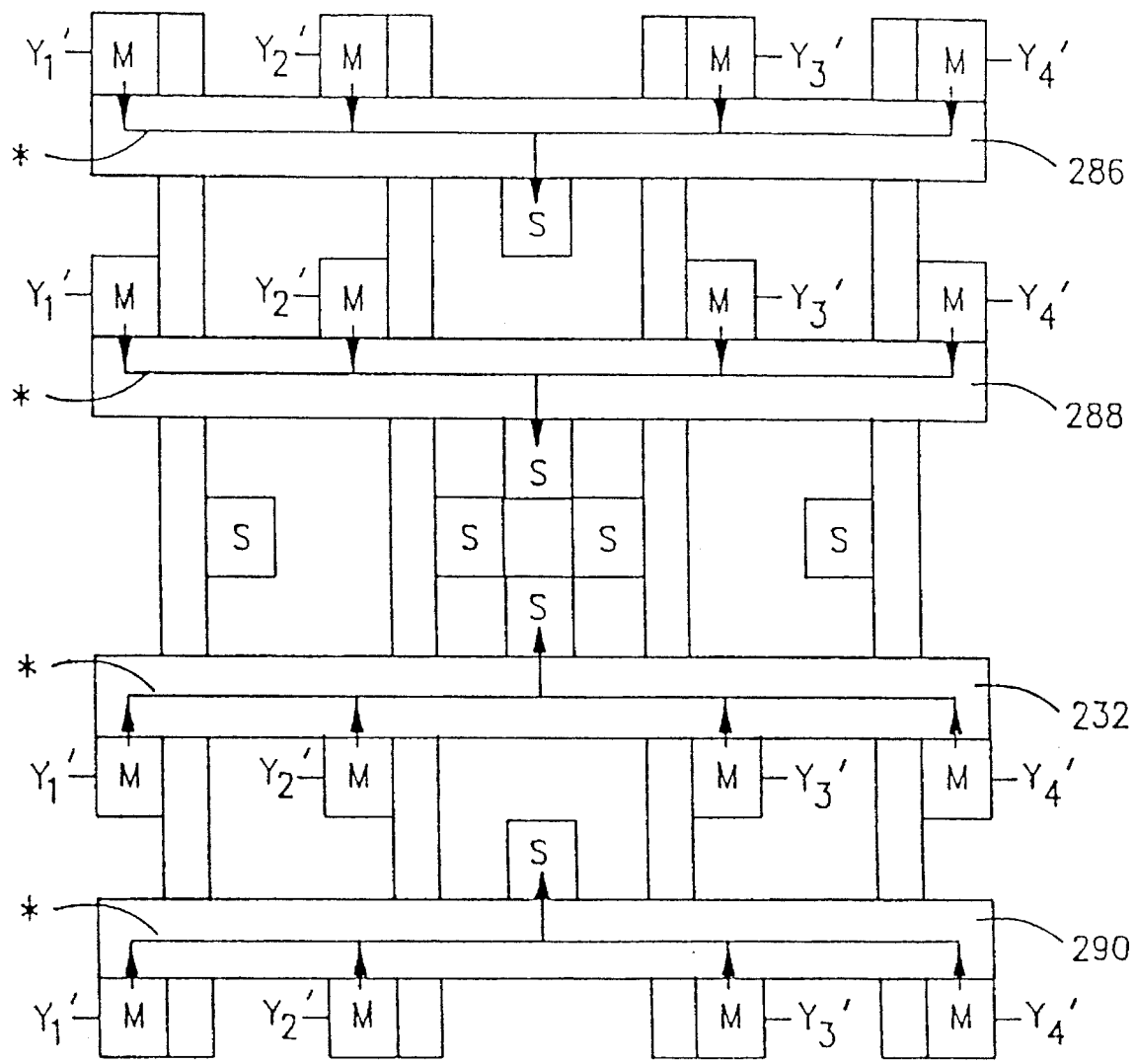

Step 6: HORIZONTAL FORWARD. Referring to FIG. 13 in connection with FIG. 4B, horizontal adder trees 232, 286, 288,290 are operated with DRVR1hs enabled, and DRVR2hs, DRVR1vs, and DRVR2vs disabled to produce the summation 171 of the weighted neuron values.

Figure 14:
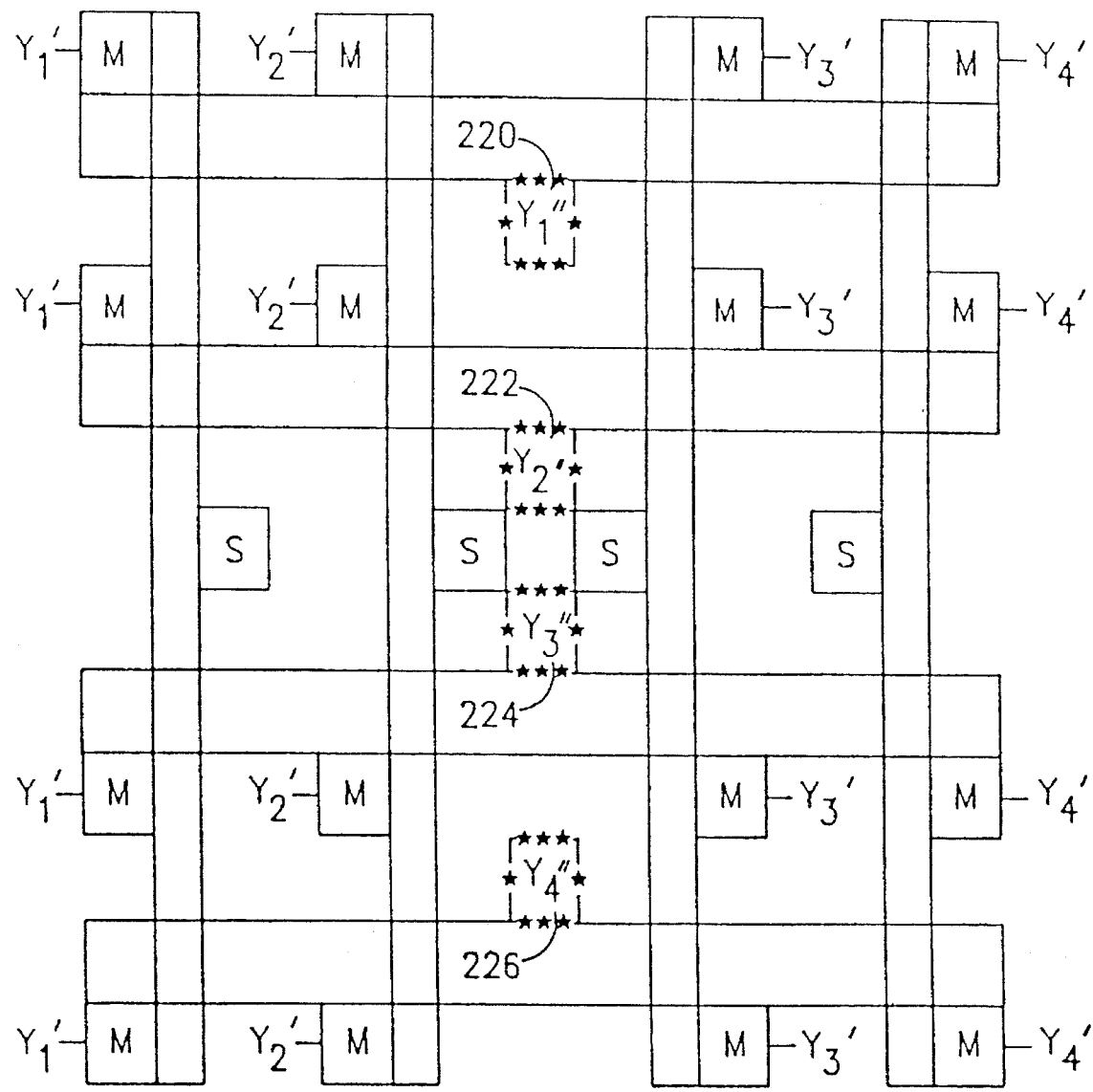
Figure 15:
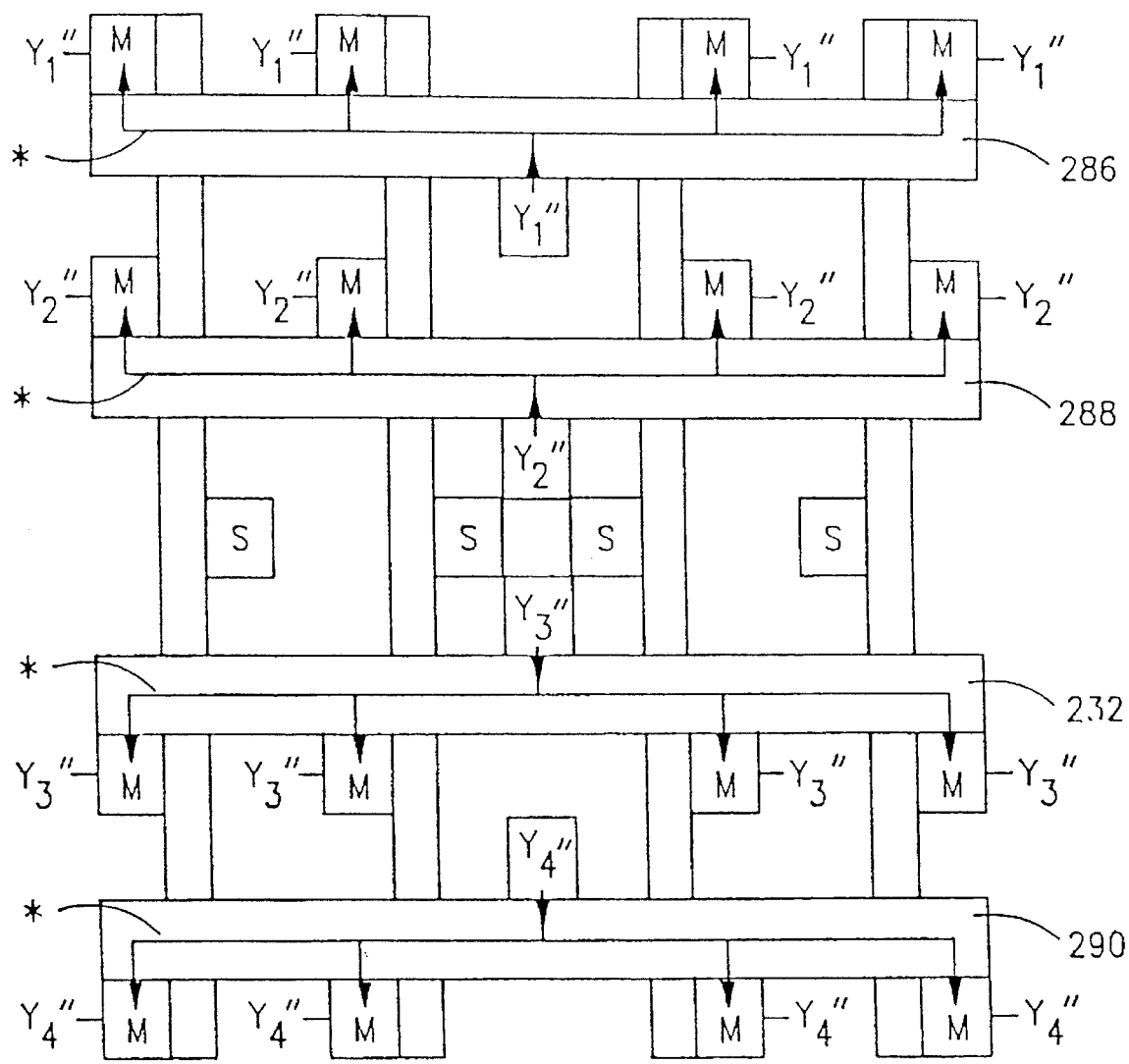

Step 7: GENERATE HORIZONTAL. Referring to FIG. 14 in connection with FIG. 6B, horizontal sigmoid generators 220, 222, 224, 226 produce $Y_i$hs $Y_1''$, $Y_2''$, Step 8: HORIZONTAL REVERSE. Referring to FIG. 15, horizontal adder trees 232, 286, 288, 290 are operated with DRVR2hs enabled, and DRVR1 hs, DRVR1vs, and DRVR2vs disabled to communicate the $Y_i$hs $Y_1''$, $Y_2''$, $Y_3''$, $Y_4''$ back to the input registers of multipliers 240, 242, ..., 250, ..., 278.

This completes the second update cycle, such that the original input values $Y_1$, $Y_2$, $Y_3$, $Y_4$, ROW twice modified, appear as $Y_1''$, $Y_2''$, $Y_3''$, $Y_4''$ positioned down the columns.

Steps 1 through 8 are repeated until a host specified number of iterations have been completed.

To evaluate the performance of the SNAP architecture with respect to the objects of the invention the following delay variables are used, representing the delay through each named element:

$\delta_M$=Multiplier delay.

$\delta_A$=Communicating Adder: 2-1 add stage delay.

$\delta_S$= Sigmoid generator delay.

$\delta_B$=Communicating Adder: communications bypass stage delay.

And the following general assumptions noted:

1. The system defined clock period is C, with all delays specified as multiples of C.

2. In this embodiment of SNAP, 2 to 1 adders are used in the summation tree function with $\log_2 N$ additional stages, where N is the total number of neurons being simulated and is equal to the number of neuron inputs.

The performance of the SNAP architecture may be represented by the time required for generating the neuron outputs. Since SNAP, as with the ring systolic array, is based on recursive equation 2, the computation of $Y_i(t+1)$ cannot begin before the previous $Y_i(t)$ values have been calculated and received at the input. In this example, the multiply and sigmoid functions are not pipelined, but require their inputs to be held constant for the whole multiplier or sigmoid delay. (Of course, they could be pipelined.) For the safeness of the structure and performance reasons, it is desired that the values for a computation are present in the inputs of the various functional units when required and that the input logic and weight access operate in parallel with the multiply operations, i.e. in pipelined mode. In order to achieve safeness with no additional delays, each operation must follow in sequence at the completion of the previous operation, as follows:

1. Multiply,
2. Add tree,
3. Sigmoid generator, and
4. Communication tree.

This sequence of events requires a simple control mechanism such as the use of a counter whose output value is compared against delay values representing the listed events, namely: the multiplier delay, the $\log_2 N$ communicating adder tree—add mode delay, the sigmoid delay, and the $\log_2 N$ communicating adder tree—communications mode delay. When a delay match occurs the next event in sequence is started.

Assuming this control sequence is followed the period between neuron values is:

SNAP period= $\delta_M+(\log_2 N)\delta_A+\delta_S+(\log_2 N)\delta_B$

Assuming $\delta_A=\delta_B=1C$, a reasonable assumption, then SNAP's period is:

SNAP period= $\delta_M+2(\log_2 N)C+\delta_S$

An assumption up to this point has been that the weights and neuron values are represented by some arbitrary number of bits reflecting the precision of the value, for example a 16 or 32 bit representation. The value representation choice can greatly limit the physical implementation of SNAP as each multiplier in the array must support the representation. $N^2$ 32 bit multipliers, for example, would greatly limit the number of neurons, N, supported by the physical implementation. In line with this design issue, is the question of how much precision is required by the neural network problem being mapped onto the SNAP implementation. The amount of precision seems to be problem specific, consequently a desirable feature for the SNAP architecture would be to allow user specified precision as required by the application. Using a bit serial approach with programmable specified bit length solves not only the user selectable precision issue but also greatly eases the physical implementation. Each multiplier's weight and $Y_j$ registers function as variable length shift registers where the bit length L of the operands is programmable from the host. The multipliers provide bit serial multiplication, with L or 2L bits of precision, injecting the result bits into the communicating adder, which is also of bit serial design. For examples of bit serial multiplier designs, see Lyon, R. F., "Two's Complement Pipeline Multipliers", IEEE Transactions on Communications, April 1976, pp. 418, 425, the teachings of which are incorporated herein by this reference. The sigmoid generator must either be of bit serial design or be able to handle variable length sum of product values.

Figure 16:
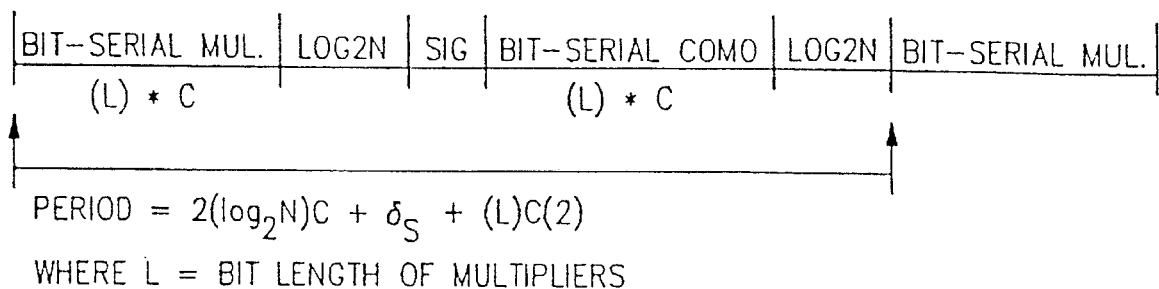
FIG. 16 is a timing diagram for the bit serial embodiment of the invention.

Referring to FIG. 16, for the case where the multiplier provides L bits of precision, the sigmoid generator is not bit serialized, but rather processes a sum of product input of length L, the bit serial SNAP period is:

Bit Serial SNAP period=$2(\log_2 N)C + 2(L)C + \sigma_s$

Figure 17:
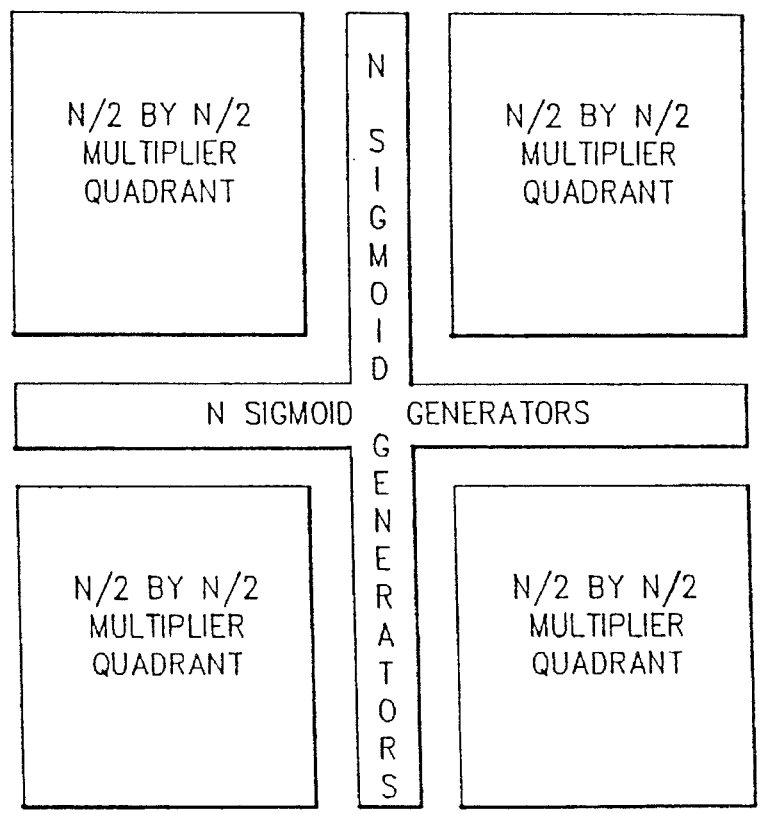
FIG. 17 is a schematic representation of a physical layout structure for the packaging and wiring of a neuron matrix.

Referring to FIG. 17, in accordance with an embodiment of the invention providing a physical layout structure having advantageous packaging and wiring characteristics for arrays of large N, the N×N array of multipliers is partitioned into four quadrants, each representing N/2 33 N/2 multipliers with adder trees, with sigmoid generators placed horizontally and vertically between the quadrants.

Figure 18A:
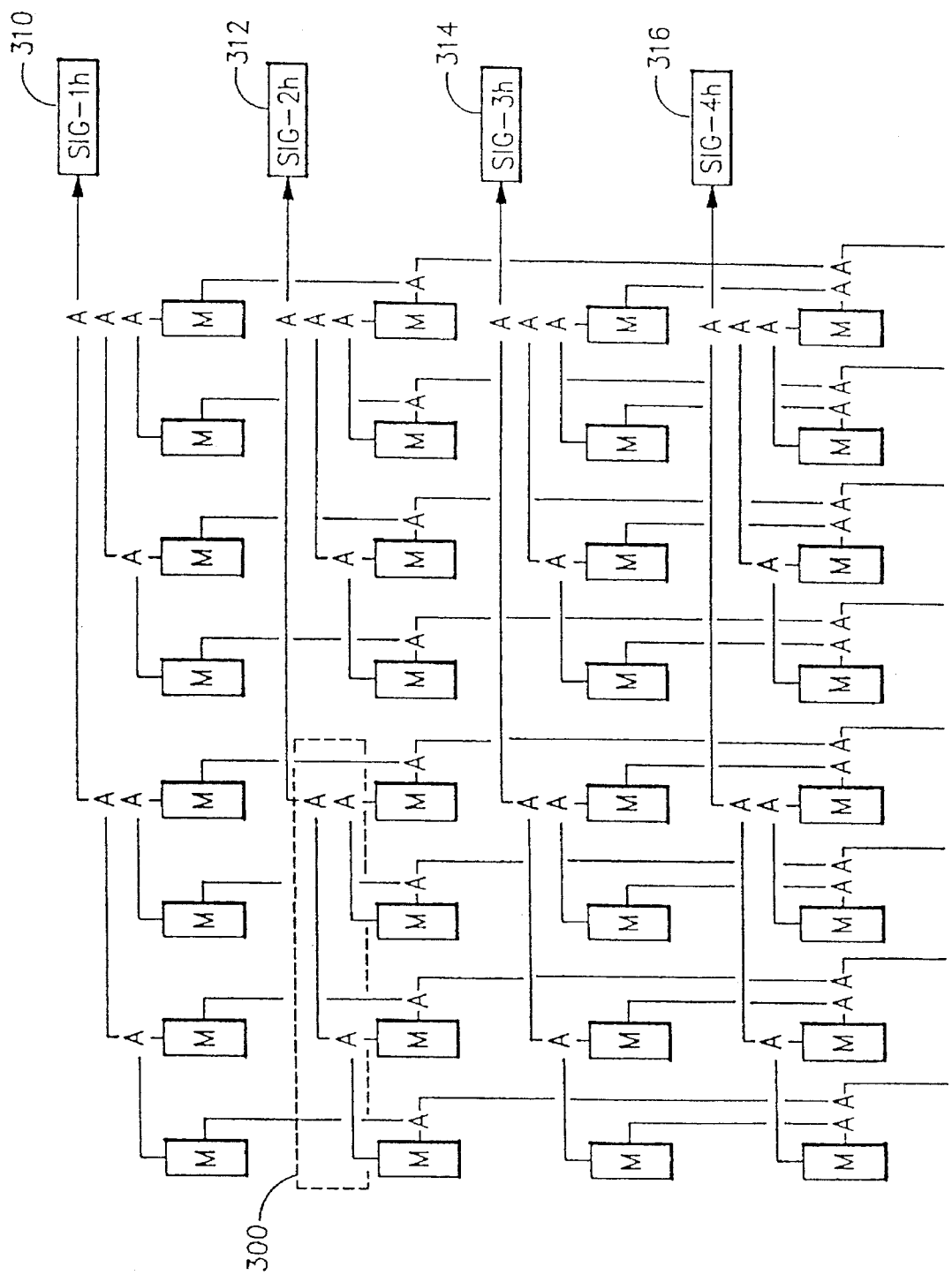

Referring to FIG. 18, for example, one of the four neuron SNAP multiplier quadrants of the array structure of FIG. 17 is shown. In FIG. 18, capital letter A indicates a 2 to 1 adder. These are arranged as horizontal and vertical adder trees, such as 300, 302, respectively, as described in connection with FIG. 4A. Multiplier cells M are as described in connection with FIG. 5A. Larger arrays utilize the same building blocks yielding a space and wiring efficient matrix. For the larger arrays the number of wire crossings for the adder tree data paths is not more than $\log_2(N/2)$ in both horizontal and vertical wiring channels. Sigmoid generators 310 through 324 are provided on the rows, and 330 through 344 on the columns, of the matrix.

Figure 19A:
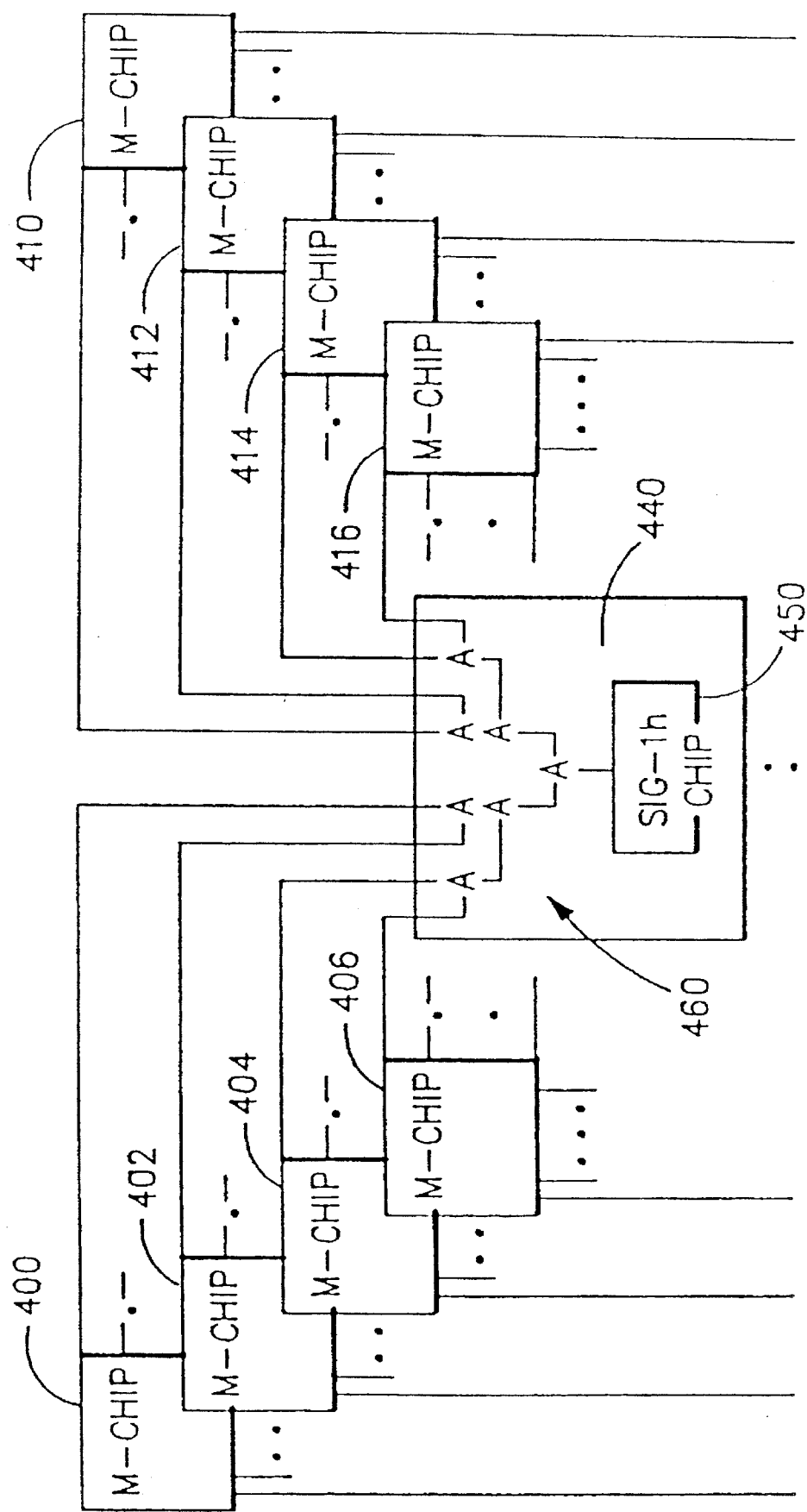

Referring now to FIG. 19, an example of a packaging scheme for the SNAP architecture of the invention will be described. Herein, two different types of chips are used, one being multiplier array M-CHIPs 400 through 436, of the form shown in FIG. 18, and the second being neuron activation function chips 440, 442, 444, 446, including input communicating adder trees 460, 462, 464, 466, respectively, for each SIG1v . . . SIG-Nv, and SIG1h . . . SIG-Nh, such as 450 through 456. In this example packaging scheme, to allow for expansion, SIG chip input communicating adder trees 460 through 466 are each modified slightly, as shown in FIGS. 20A and 20B.

Figures 20A, 20B:
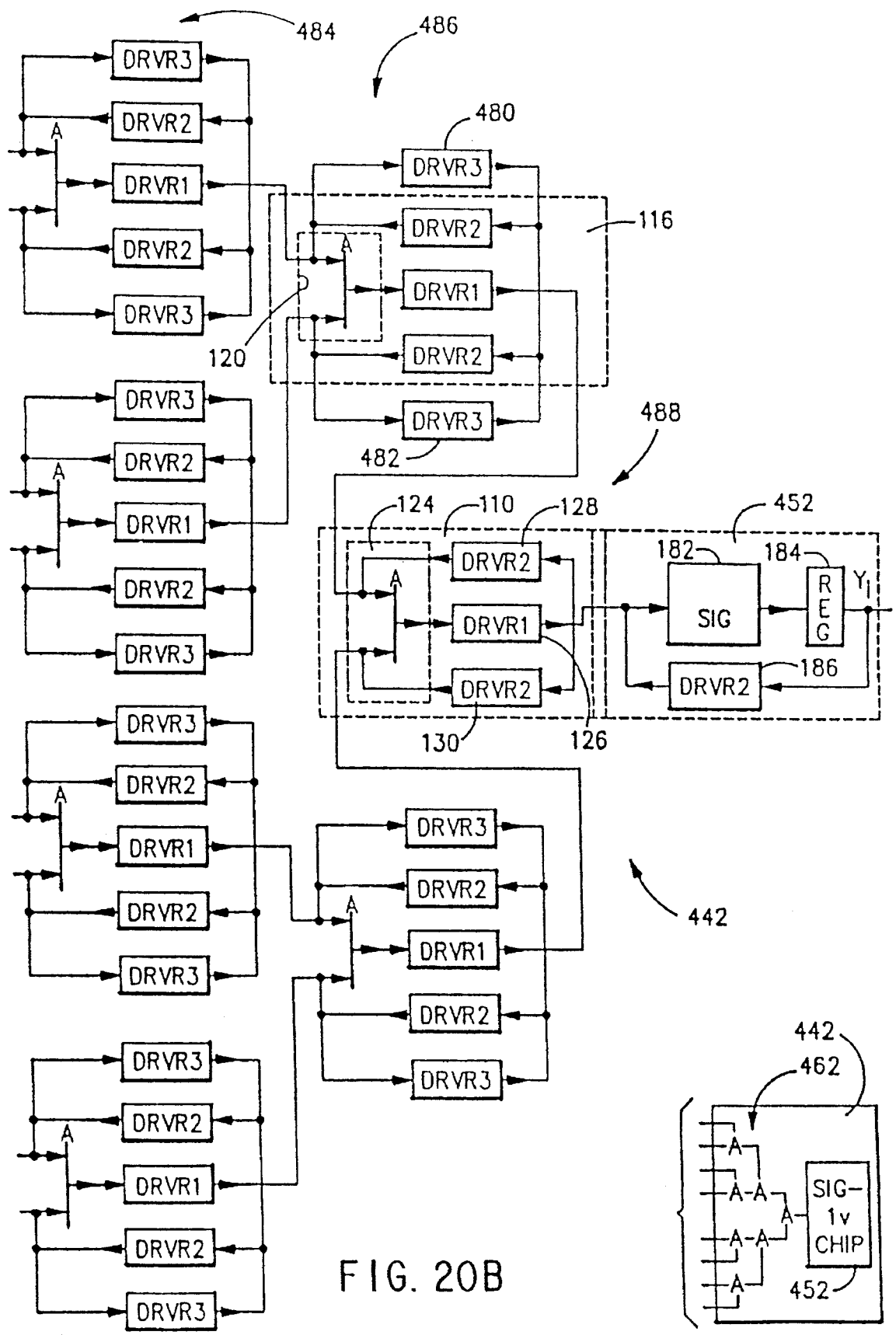

Referring to FIG. 20B, additional drivers, DRVR3, such as 480, 482, have been added to adder stages 484, 486, allowing adder stages, such as 120, to be bypassed under control of state definition control 34 (FIG. 21) in a forward direction in a similar manner to the bypass of adders, such as adder 124, provided in the reverse direction by DRVR2s 128, 130. An adder stage is bypassed in the forward direction when that stage is not required by the system being built. In a smaller system, chips are connected and input adder stages are bypassed such that the chips used connect to the correct level in the adder tree. With the SIG chip example of FIG. 20 containing three adder stages 484, 486, 488, two different systems can be built, one with one M-CHIP per quadrant and the second with four M-CHIPs, such as 400, 402, 404, 406 per quadrant as shown in FIG. 19. Of course larger input trees can be designed into the SIG chip allowing much greater growth. This is not a particular chip I/O problem since the connections to the adder tree may be bit serial. With this scheme the expansion must be done by a factor of four within each quadrant in order to keep a symmetric N/2×N/2 relationship within the quadrant. For examples see Table 3 of FIG. 34.

Figure 21:
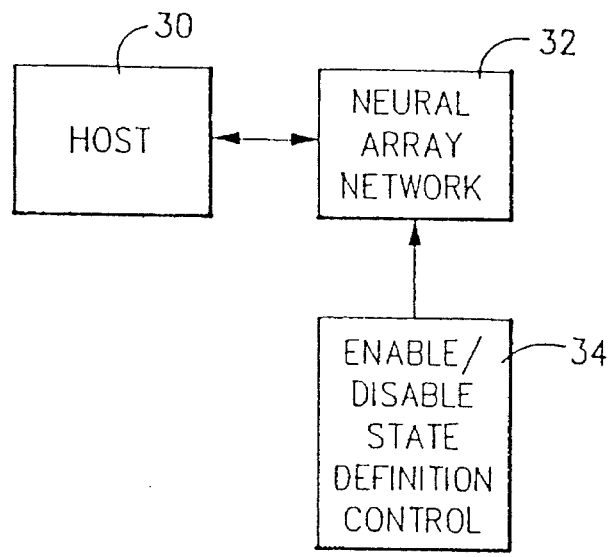
FIG. 21 is a schematic block diagram illustrating the neural array network of the invention within a host environment.

Referring to FIG. 21, host 30 is shown in two way communication with scalable neural array processor 32, which includes various drivers, such as DRVR1, DRVR2, DRVR3 all responsive to enable/disable state definition control 34 in accordance with the protocols herein described.

Figure 22:
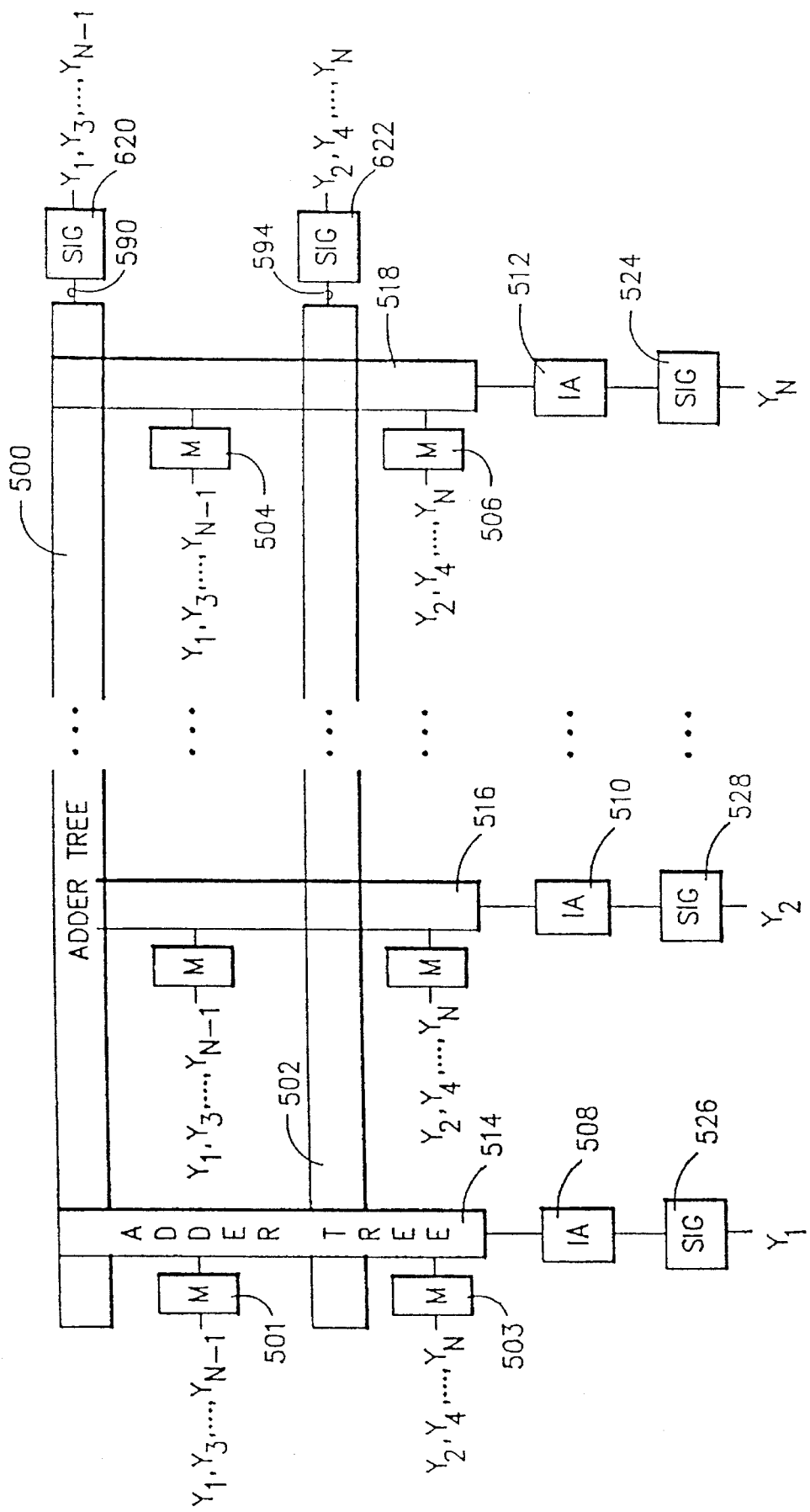
FIG. 22 is a schematic representation of the row scalability embodiment of the invention showing the use of an iterative adder.

Referring to FIG. 22, a row scalability embodiment of the invention will be described. In this embodiment, provision is made for processing an N by N neural array matrix less than N rows at a time; in this example, two rows at a time. Thus, two rows 500, 502, each N multipliers 504, 506 long, have iterative adders 508, 510, . . . , 512 installed on the outputs of vertical communicating adder trees 514, 516, . . . , 518, respectively.

Figure 23:
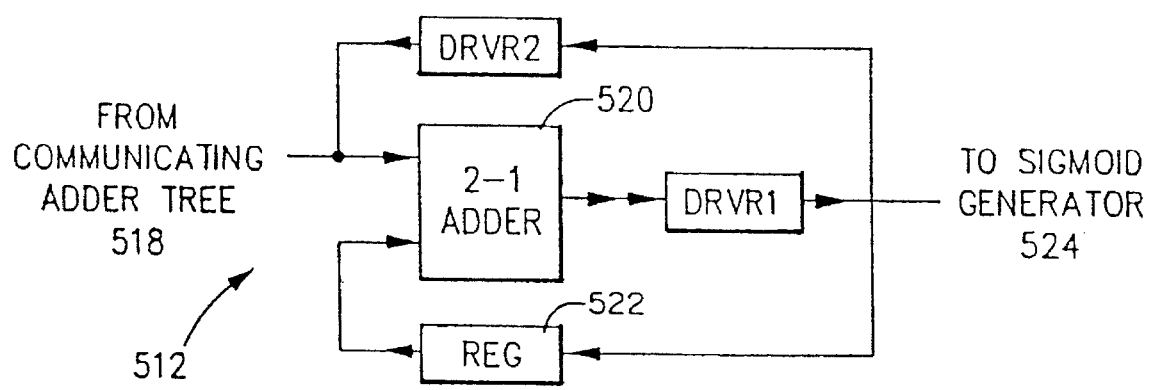
FIG. 23 is a schematic block diagram of the iterative adder of FIG. 22.

Referring to FIG. 23, iterative adder 512, for example, comprises adder 520 and storage register 522. Iterative adder 512 accumulates in register 522 partial summations from vertical communicating adder tree 518 as column 518 is cycled N/#Rows times until the final summation is formed and then supplied to Sigmoid generator 524. Similarly, iterative adders 508 and 510 accumulate the partial sums from adder trees 514, 516 respectively, two rows 500, 502 (#Rows) at a time, and provide the final summation to activation (Sigmoid) functions 526, 528, respectively. After these column summations are completed, N neuron values are generated by activation functions 524, 526, 528, . . . , and communicated back up adder trees 514, 516, . . . , 518 to horizontal adder trees 500, 502, as will be described hereafter in connection with FIGS. 24 through 26.

Figure 24:
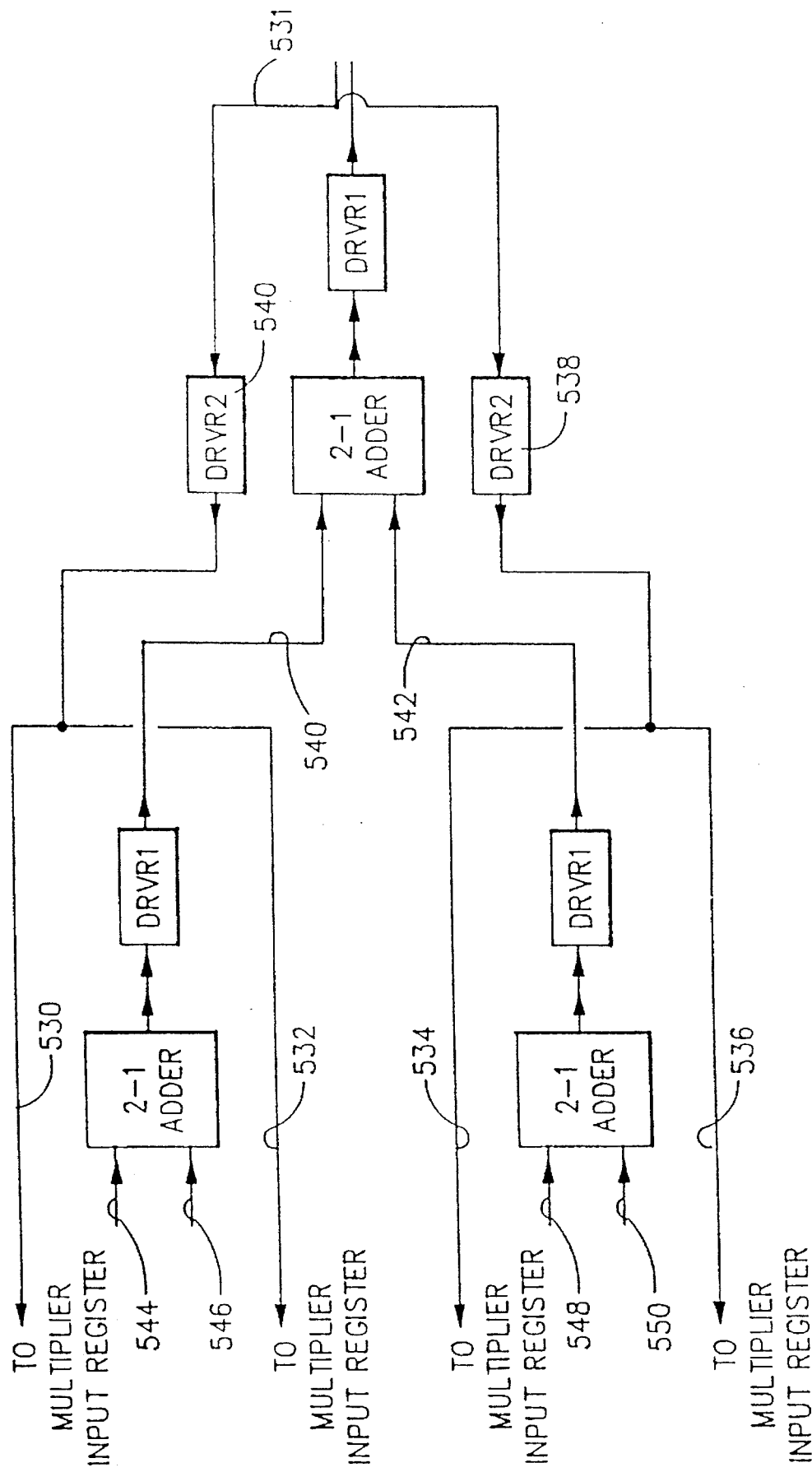
FIG. 24 is a schematic block diagram of the dual path adder embodiment of the invention.

Referring to FIG. 24, vertical adder tree 518 (see FIG. 22) is shown in accordance with the dual path embodiment of the invention. Herein, for performance reasons and in contrast to adder tree 108 (FIG. 4B), separate reverse communication paths 530, 531, 532, 534, 536 are provided from sigmoid 524 register 570 (FIG. 26B) output $Y_N$ back to multipliers 504, 506, . . . (While four reverse communication patios 530 through 536 are shown in FIG. 24, only two would be required for the two-row at a time embodiment of FIG. 23.) Depending upon the size of tree 108, and the technology used, drivers DRVR2 538, 540 are used on the reverse communication paths 530 through 536 to handle the loading. While reverse communication paths 530, 532, 534, 536 are shown following adder tree paths 540 through 550, this is not necessary, as their destinations are input registers 564 (FIG. 25B) to multipliers, such as 504, 506.

Figure 25A:
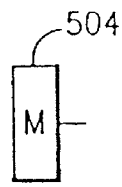
FIGS. 25A and 25B are schematic block diagrams of the multiplier function, illustrating another aspect of the dual path adder embodiment of the invention.

Referring to FIGS. 25 and 26, multipliers 504, 506 and sigmoid generator 524 are modified by providing lines 560, 562 to allow for this separate reverse communication path.

Figure 25B:
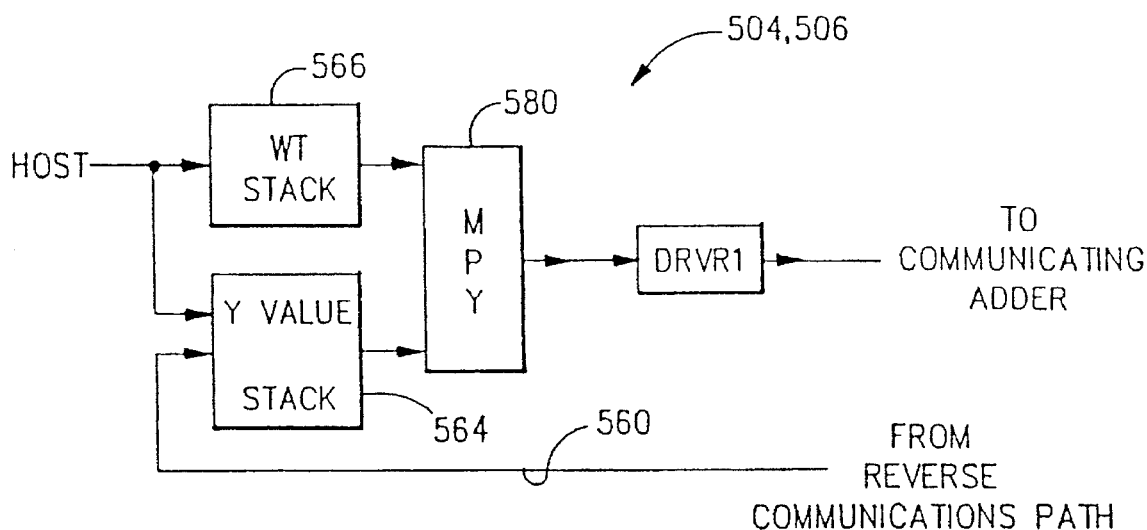
Figure 26A:
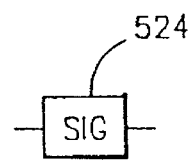
FIGS. 26A and 26B are schematic block diagrams of the sigmoid, or activation, function for the row scalability embodiment of FIG. 22.
Figure 26B:
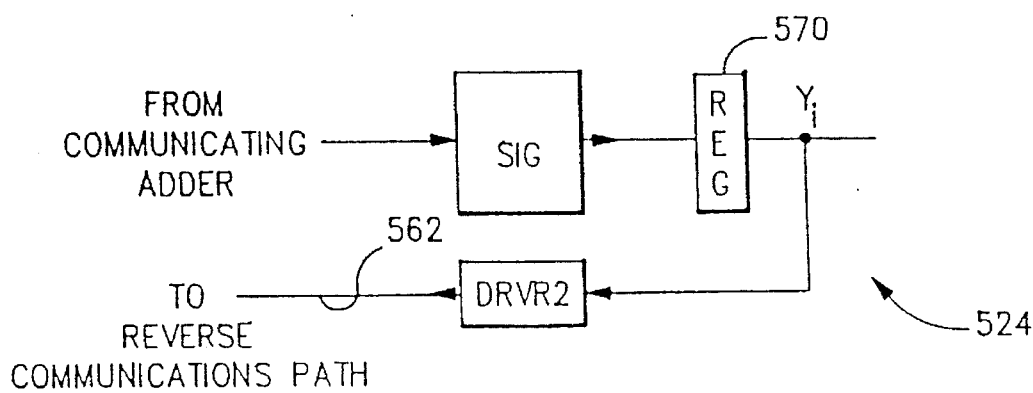

Referring to FIG. 25B, multiplication function 504, for example, stores N/#Rows of neuron values and associated weights in Y value stack 564 and weight stack 566, respectively. Stacks 564, 566 store N/#Rows of neuron values in a first-in first-out arrangement. Similarly, referring to FIG. 26B, as each row 500, 502 must be cycled N/#Rows times, Sigmoid generator 524 (FIG. 26A) includes register 570 and thus is of pipelined design to allow for overlapped operations.

Figure 27:
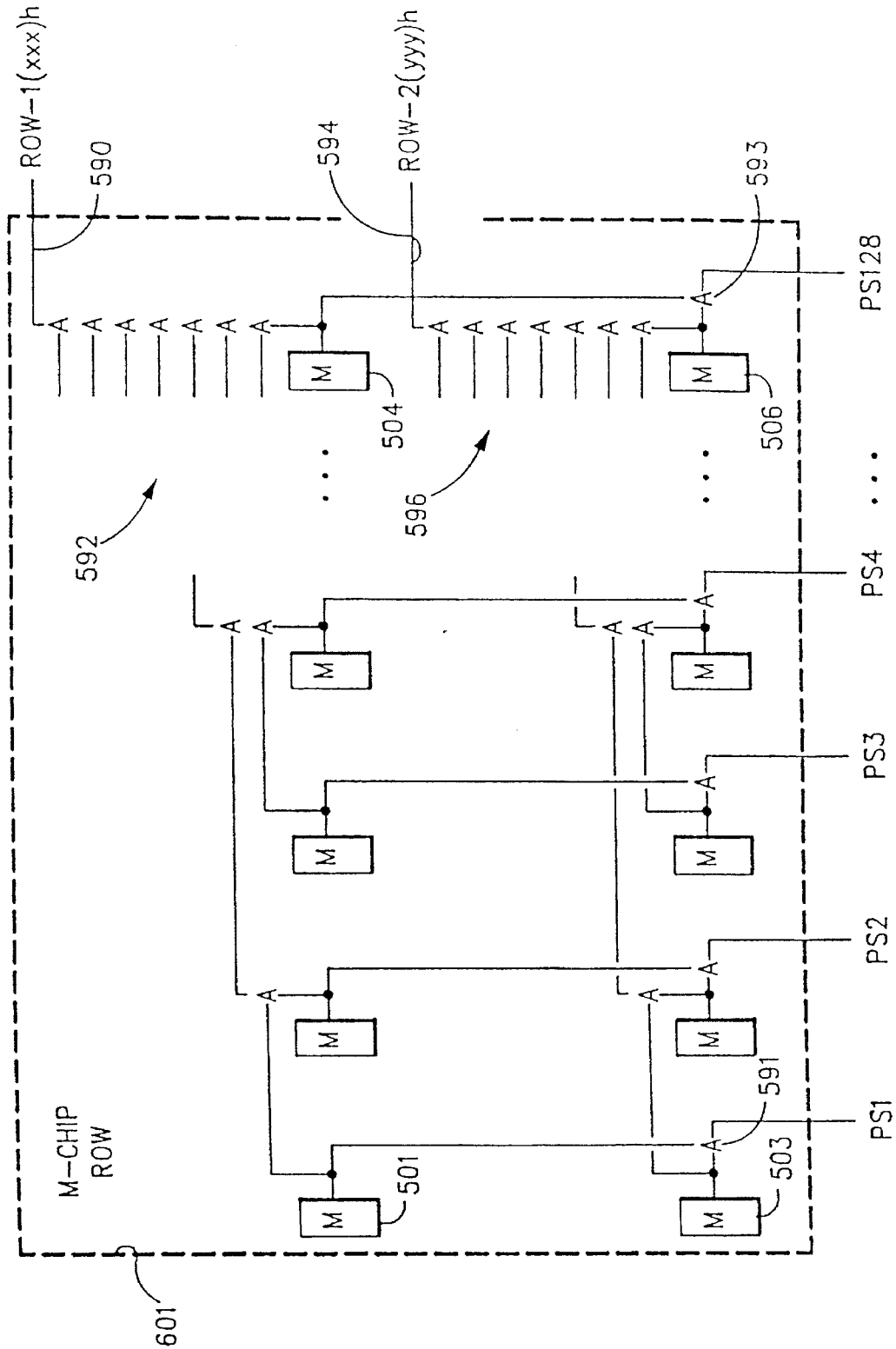
FIG. 27 is a schematic block diagram of an example of a multiplier chip for row scalability.
Figure 28:
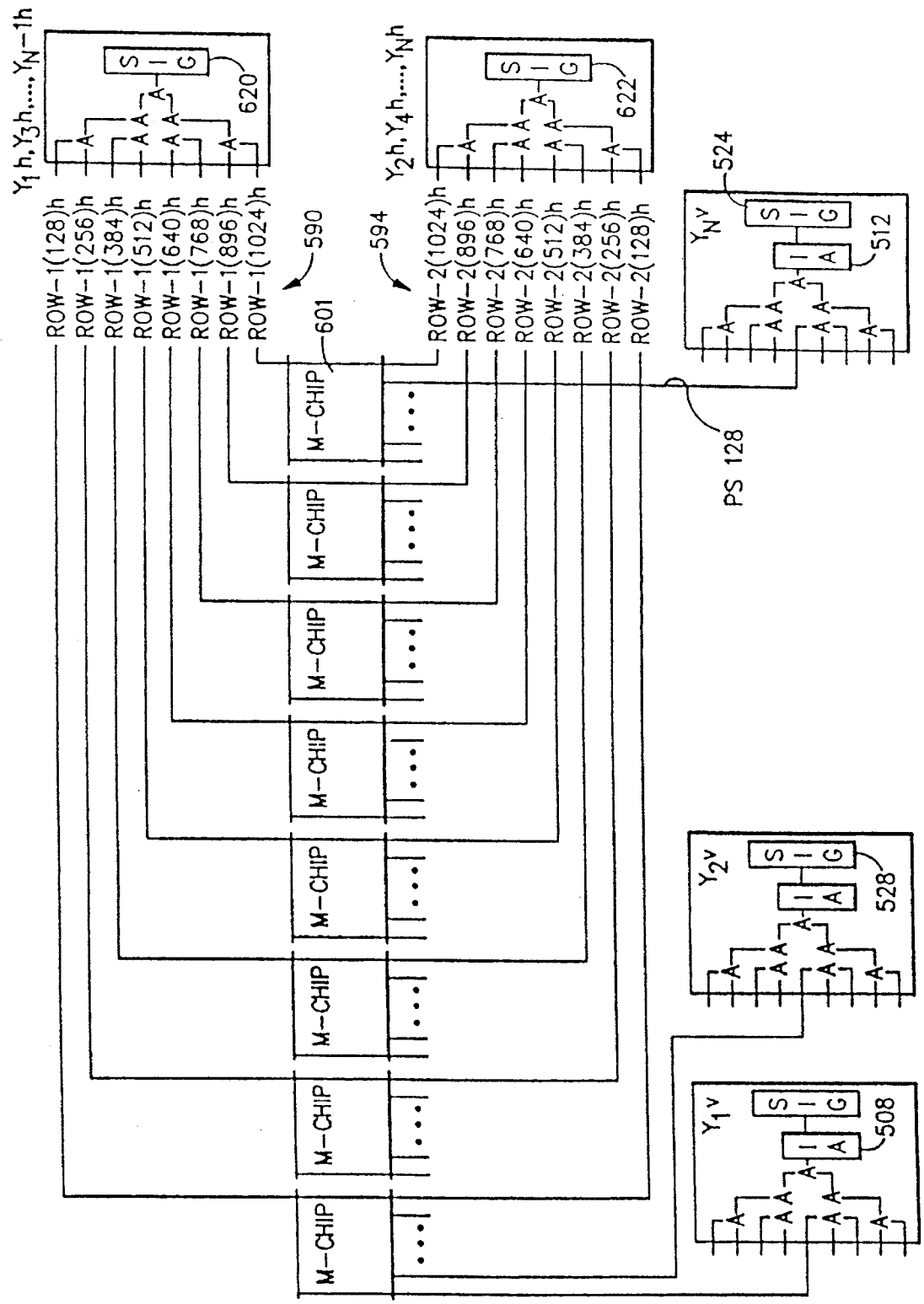
FIG. 28 is a schematic representation illustrating an example of a multiplier array chip for a row scalability embodiment of the invention, using a two row building block for an N= 1024 neuron system.

Referring to FIG. 27 in connection with FIG. 22, a row scalability embodiment of the invention is illustrated wherein two rows represent minimum building block for 2×128 multiplier array chip 601 with 2-7 stage dual path adders, one per row 500, 502, and 128 one stage adders 591 593, one per column 514, . . . , 518, used to create an N=1024 neuron system. Lines ROW-1(xxx)h 590 are the outputs of seven stage communicating adders 592 for first row 500, replicated at lines 594 and adders 596 for second row 502. Herein, column output partial sum lines PS1, PS2, PS3, . . . , PS128 are provided, each for connecting to iterative adders 508, 510, . . . , 512 in a sigmoid generator chip with the input tree bypassed. Expansion is done by adding rows to the system and connecting the sigmoid generator chips as shown in FIG. 28.

The performance of SNAP with row scalability is not symmetric as would be expected with a period associated with the column $Y_i$ production and a different period associated with the row $Y_i$ production.

SNAP Row Scalability Column Period=

SNAP Row Scalability Column Period =

$$\left(\frac{N}{\#ROWS}\right)\delta_M + 2\log_2(\#ROWs) + \delta_{1A} + \delta_S$$

Where: $\delta_{1A}$ is the Iterative Adder delay

SNAP Row Scalability Row Period =

$$\left(\frac{N}{\#ROWs}\right)\delta_M + 2\log_2 N + \delta_S$$

As rows are added the performance becomes more symmetric and with N columns×N rows, equals the performance of SNAP without row scalability, as previously discussed.

Figure 29:
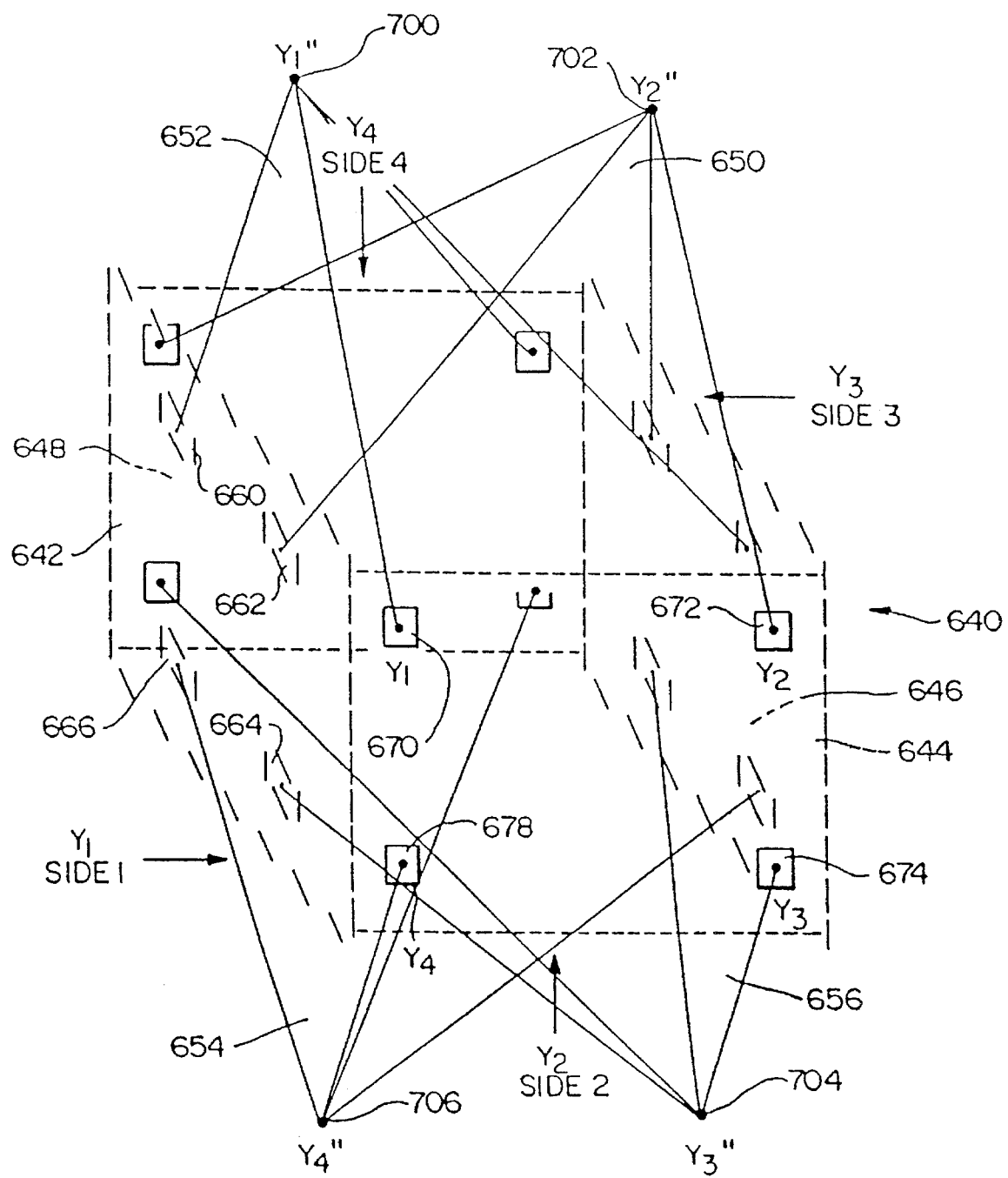
FIG. 29 is a schematic representation of a three dimensional embodiment of the invention for a four neuron SNAP.
Figure 30:
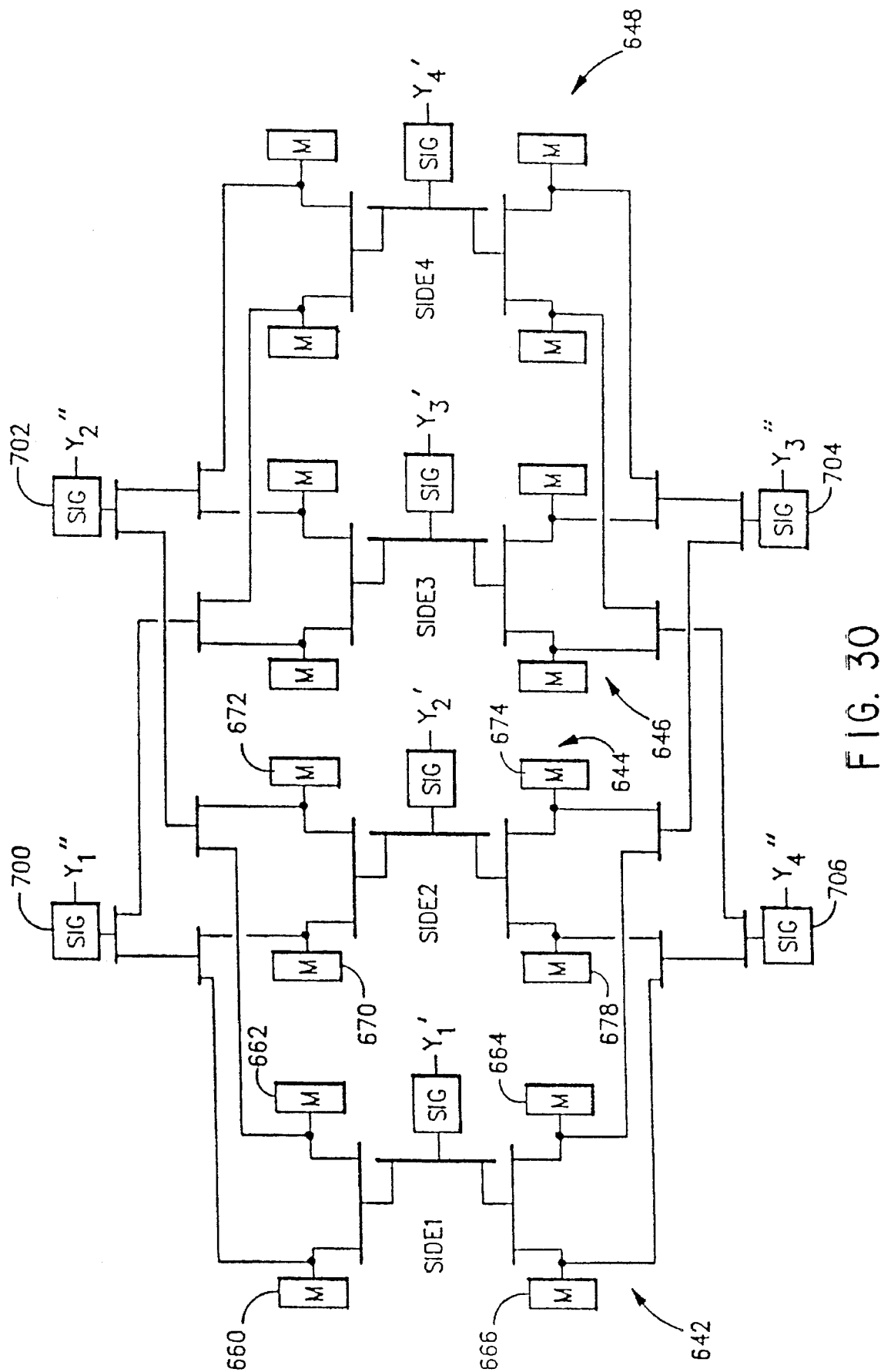
FIG. 30 is a schematic block diagram of the three dimensional, four neuron SNAP embodiment of FIG. 29.
Figure 31:
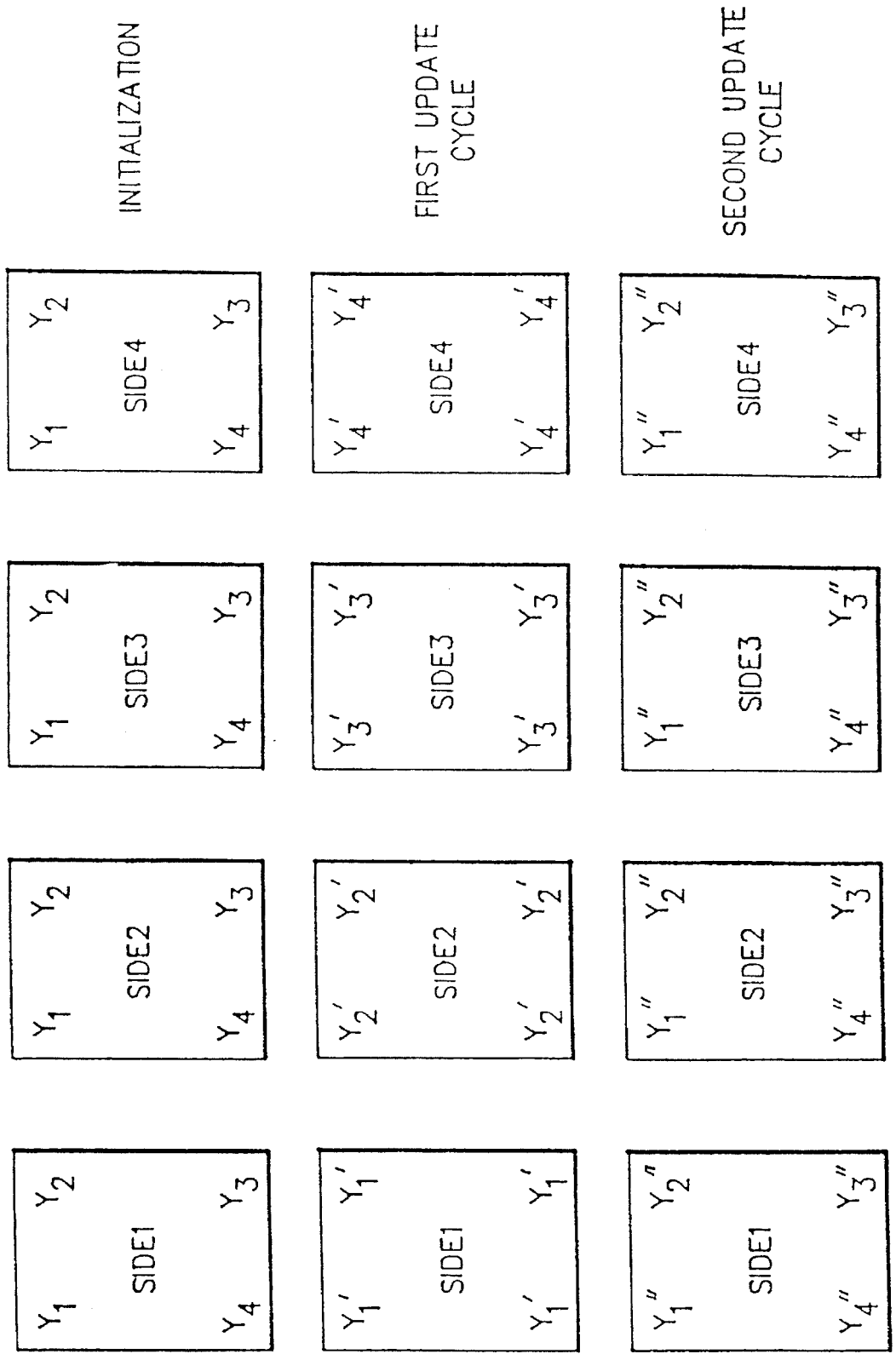
FIG. 31 is a schematic representation of neuron input values through two update cycles of operation of the three dimensional, four neuron SNAP embodiment of FIGS. 29 and 30.

Referring to FIGS. 29 and 30, the SNAP orthogonal switching concept of the invention is extended from the two dimensional row/column switch in neuron definition to a three dimensional switch between planes of neurons. In the cube like structure 640 of FIG. 29, four planes 642, 644, 646, 648 each represent one of the neurons in a four neuron network. Add convergence is illustrated by four pyramid like structures 650, 652, 654, 656, one for each neuron, comprising 2 to 1 adder elements. Thus, side1 642 represents a first neuron, including input elements 660, 662, 664, 666 initialized to values $Y_1, Y_2, Y_3, Y_4$, respectively. During a first cycle of operation, the first neuron value $Y_1'$ is generated and loaded back into input elements 660, 662, 664, 666. During a second cycle, the $Y_1'$ value from input element 660, the $Y_2'$ value from input element 670, and $Y_3'$ and $Y_4'$ values from corresponding input elements from side3 646 and side4 648 are fed to sigmoid generator 700 to produce value $Y_1''$. In FIGS. 30 and 31, the cube structure of FIG. 29 is unfolded to illustrate a four-neuron snap through two update cycles. The concept of orthogonality is preserved in this embodiment, inasmuch as each input element, such as element 660, is time shared between two neurons, in this case a first neuron comprising input elements. 660, 662, 664, 666 and a second neuron comprising input elements 660, 670, . . .

By using the communicating adder tree, as herein described, or any similar interconnection structure, and the SNAP structure of the invention, the inherent limitations of the $N^2$ connections is greatly minimized allowing a regular structure for expandability while still keeping complete interconnectivity. Furthermore the performance impact of the required $N^2$ communications is $\log_2 N$, which is a small impact as N increases.

In Table 4 of FIG. 35 a summary performance evaluation and comparison with alternate architectures is set forth, including hardware cost and performance comparison between the SNAP, BIT SERIAL SNAP, and SNAP ROW architectures of the invention, and the SYSTOLIC RING architecture of the prior art, as compared with the improved T-SNAP architecture, which is the preferred embodiment of this application.

T-SNAP: A TRIANGULAR SCALABLE NEURAL ARRAY PROCESSOR

As will be appreciated from FIG. 35, improved performance for a scalable array processor will be achieved by all SNAP embodiments; however, the most efficient hardware implementation will be achieved by the preferred embodiment which we call Triangular SNAP or T-SNAP. From equation (2) supra., repeated here, it can be noted that there are $N^2$ weights contained in the whole network structure of N neurons.

$$Y_i = F\left(\sum_{j=1}^{N} Y_j W_{ij}\right)$$

These $N^2$ weights can be arranged in an i-column/j-row array or matrix form. In this T-SNAP variation of SNAP, the structure is looked at from the perspective of the weight matrix. An example of a weight matrix for an eight neuron assembly for Triangular SNAP is shown in FIG. 36.

The weight matrix of FIG. 36 is folded along the diagonal as shown in FIG. 37. The folding of the matrix does not cause any loss in generality but just places the symmetric weights together, i.e. $W_{ij}$ with $W_{ji}$. The placement of the symmetric weights together is an important characteristic of the T-SNAP.

FIG. 38 adds the neuron Y values associated with the weights of FIG. 37.

Figure 39:
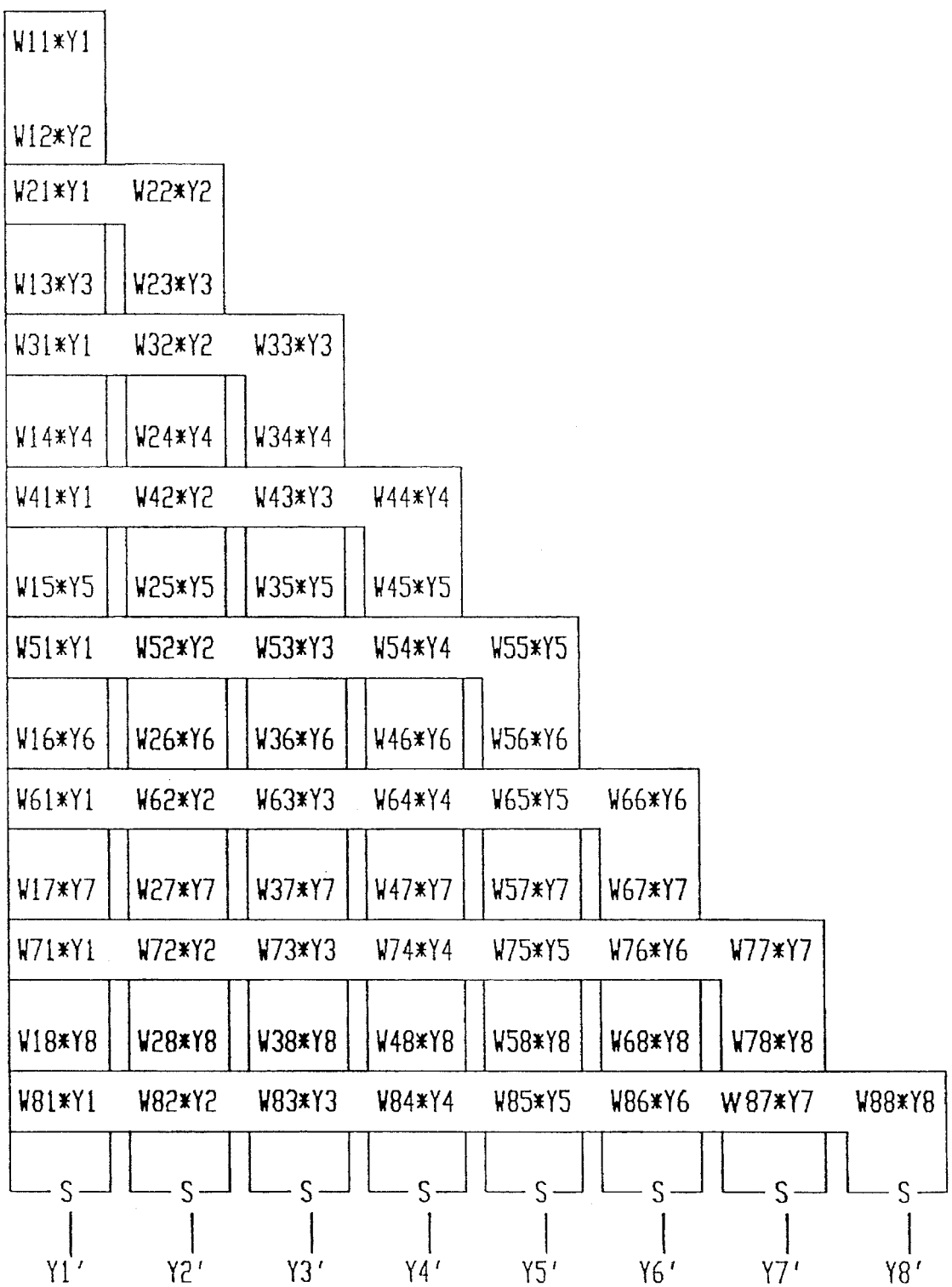
FIG. 39 outlines the neurons on the structure of FIG. 38.

FIG. 39 outlines the neurons on the structure of FIG. 38. For example in FIG. 39, Neuron 5, producing $Y_5$ from equation 2 with i=5 and j varying from 1 to N, is represented by the outline of the N product terms, that are highlighted in a bold font. The function F is assumed to be a neuron activation function such as the sigmoid function as previously described in this paper. The equation for Neuron 5 is printed here for easy reference with FIG. 39.

$$Y_5 = F(W_{51} + W_{52}Y_2 + W_{53}Y_3 + W_{54}Y_4 + W_{55}Y_5 + W_{56}Y_6 + W_{57}Y_7 + W_{58}Y_8)$$

In FIG. 39 S represents the sigmoid generators.

The preferred embodiment of the inventions utilize two common assemblies which are replicated throughout the system, and which permits the scalability of the architecture by expansion of the common replicated assemblies. One assembly is called a diagonal cell and the other assembly utilizes a cell which we call a G-CELL, or general cell.

Figure 40:
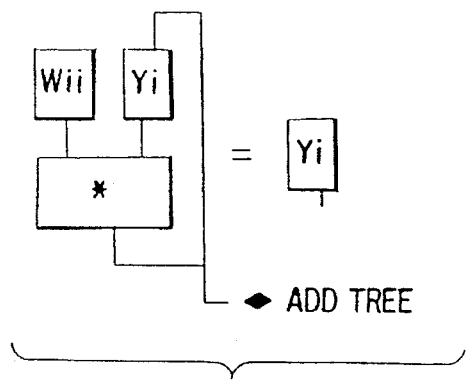
FIGS. 40A and 40B symbolically represent two "cells of the structure", and the first "cell"
Figure 40:
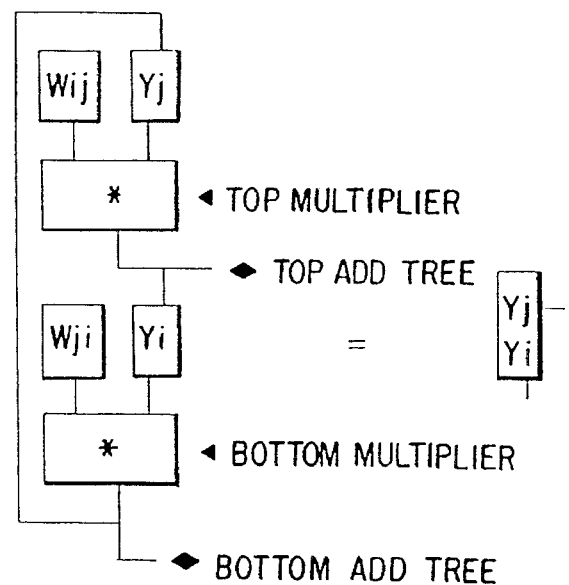

Two types of general "cells", (the common replicated assembly), are required to implement the T-SNAP. An element of FIG. 39 is assumed to consist of a weight register, a Y value register, and a multiplier. The first "cell", FIG. 40A, is associated with the diagonal elements, $W_{ii} \times Y_i$, and the second "cell", G-CELL, FIG. 40B, is associated with the rest of the elements of the folded matrix structure of FIG. 39 and contains two elements placed in the "cell" shown in a top and bottom arrangement. A symbolic representation of the two "cells" is given in FIG. 40 labeled with their associated neuron values. In operation, the diagonal cell multiplies its stored weight with its stored Y value and supplies the multiplied result to the attached add tree. In the reverse communications mode, a Y value is received from the attached add tree and stored into the Y value register. The other "G-CELLS" of the structure also generate a weight times Y value and supply the product to their attached add trees. In the reverse communications mode for these "G-CELLS", a $Y_j$ value received from the bottom multiplier add tree is stored into the top Y value register and likewise a $Y_i$ value received from the top multiplier add tree will be stored into the bottom Y value register. This switch in storing the Y values is an another essential characteristic of the T-SNAP.

Figure 41:
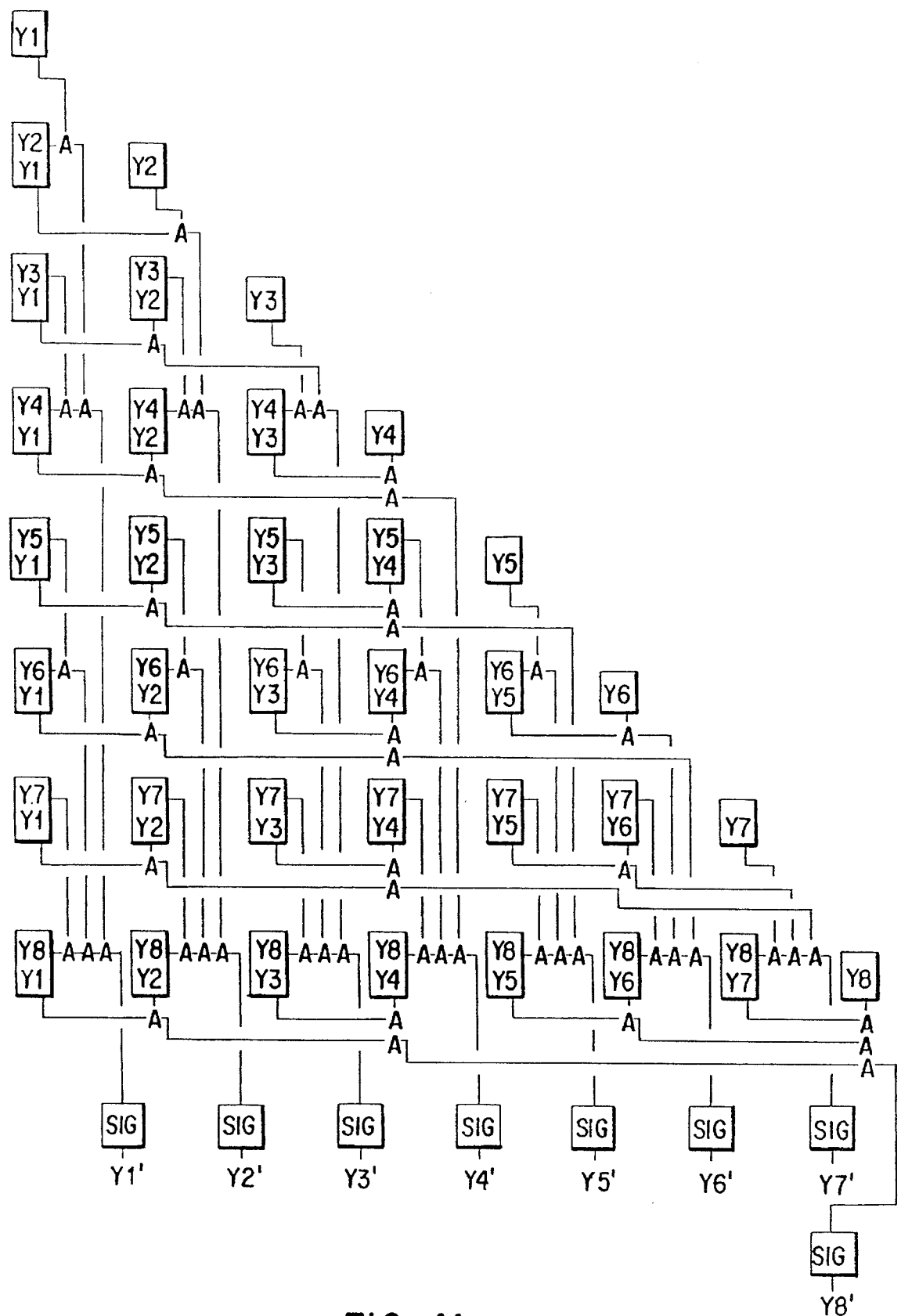
FIG. 41, using the "cell" symbols, shows an 8 neuron example which connects the communicating adder trees and sigmoid generators of the triangular scalable neural array processor(T-SNAP) to provide a complete picture of the neuron structures.
Figure 42A:
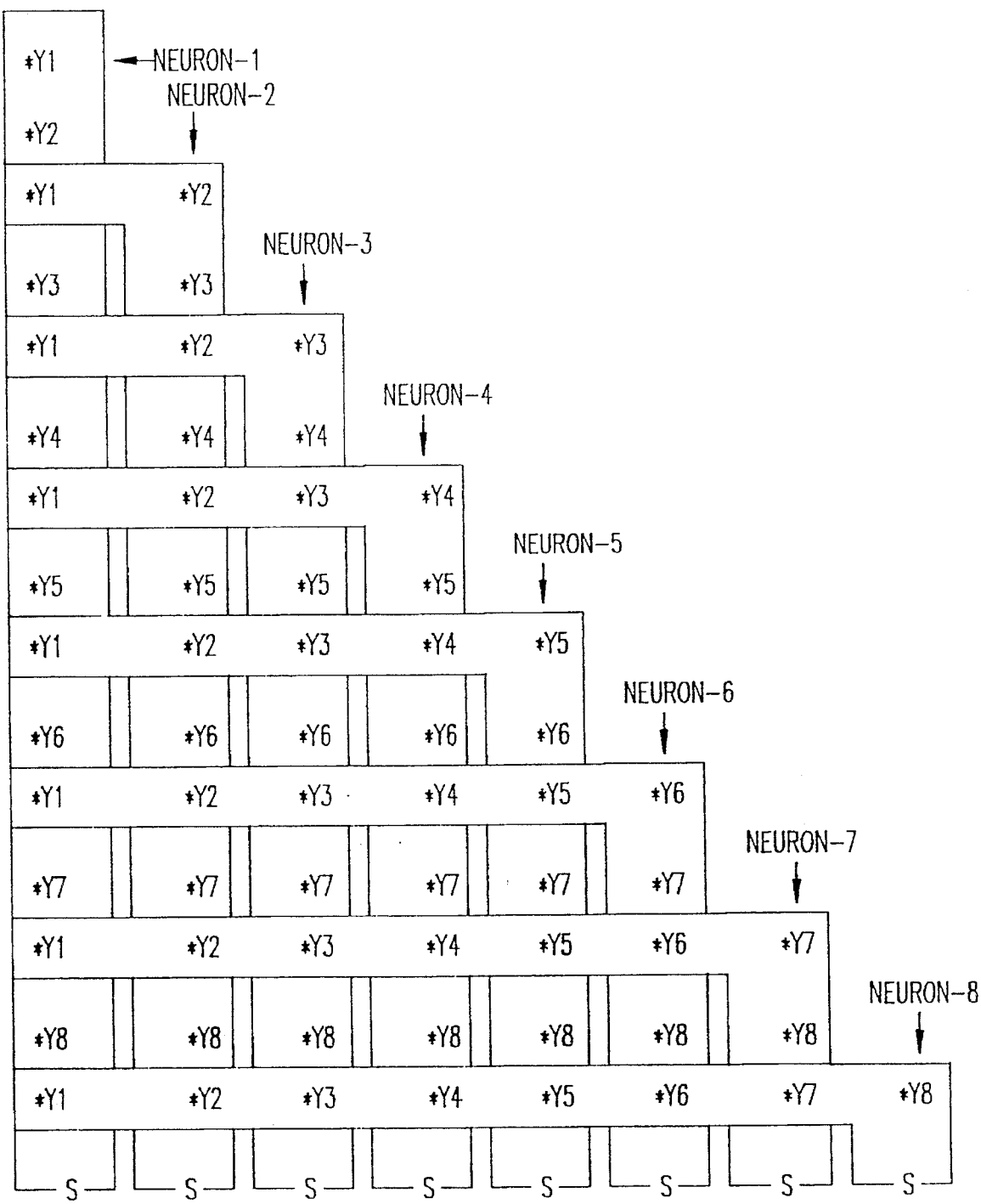
FIG. 42, depicts the four major steps in the operation of the T-SNAP following the format of FIG. 39.
Figure 42B:
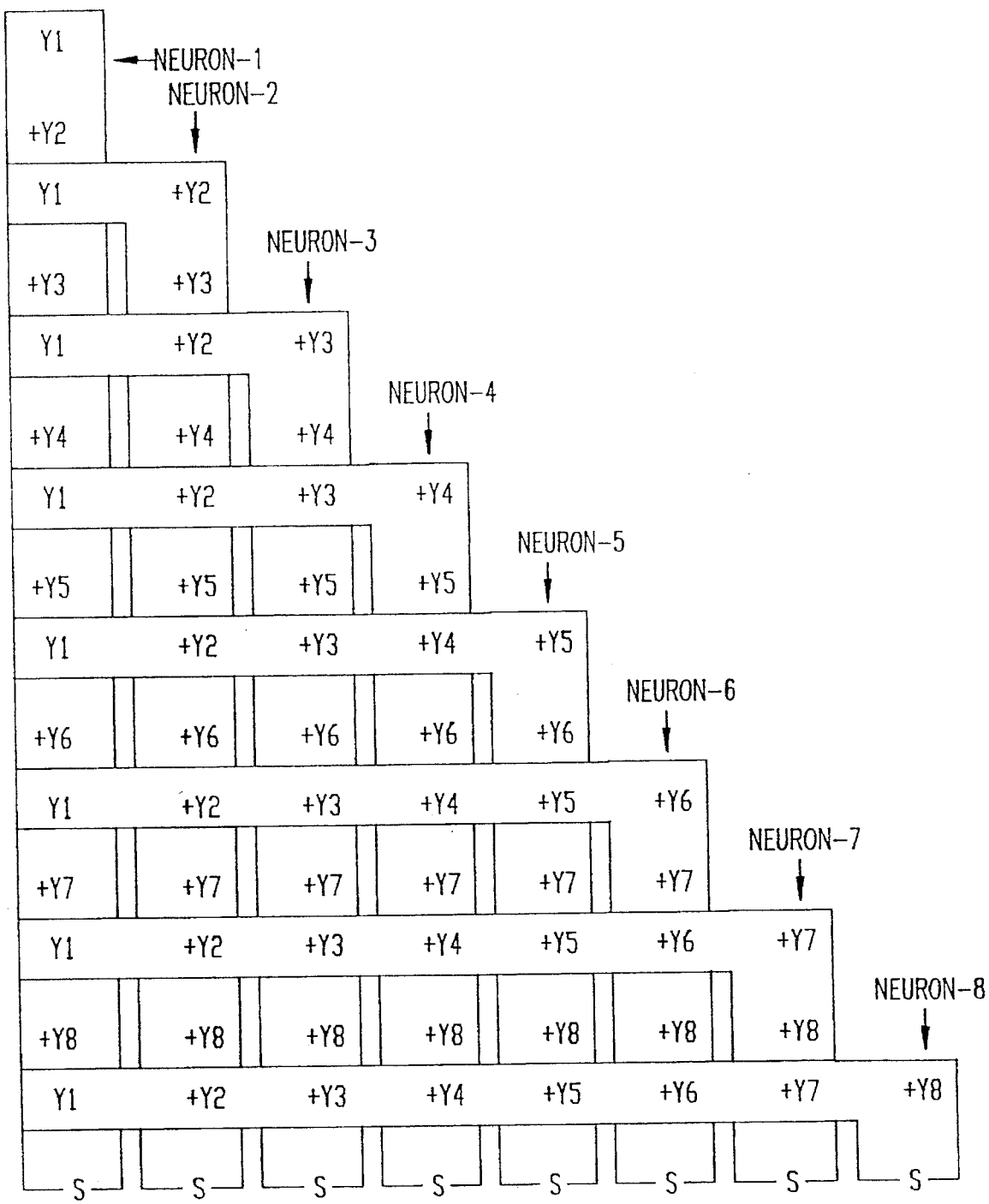
Figure 42C:
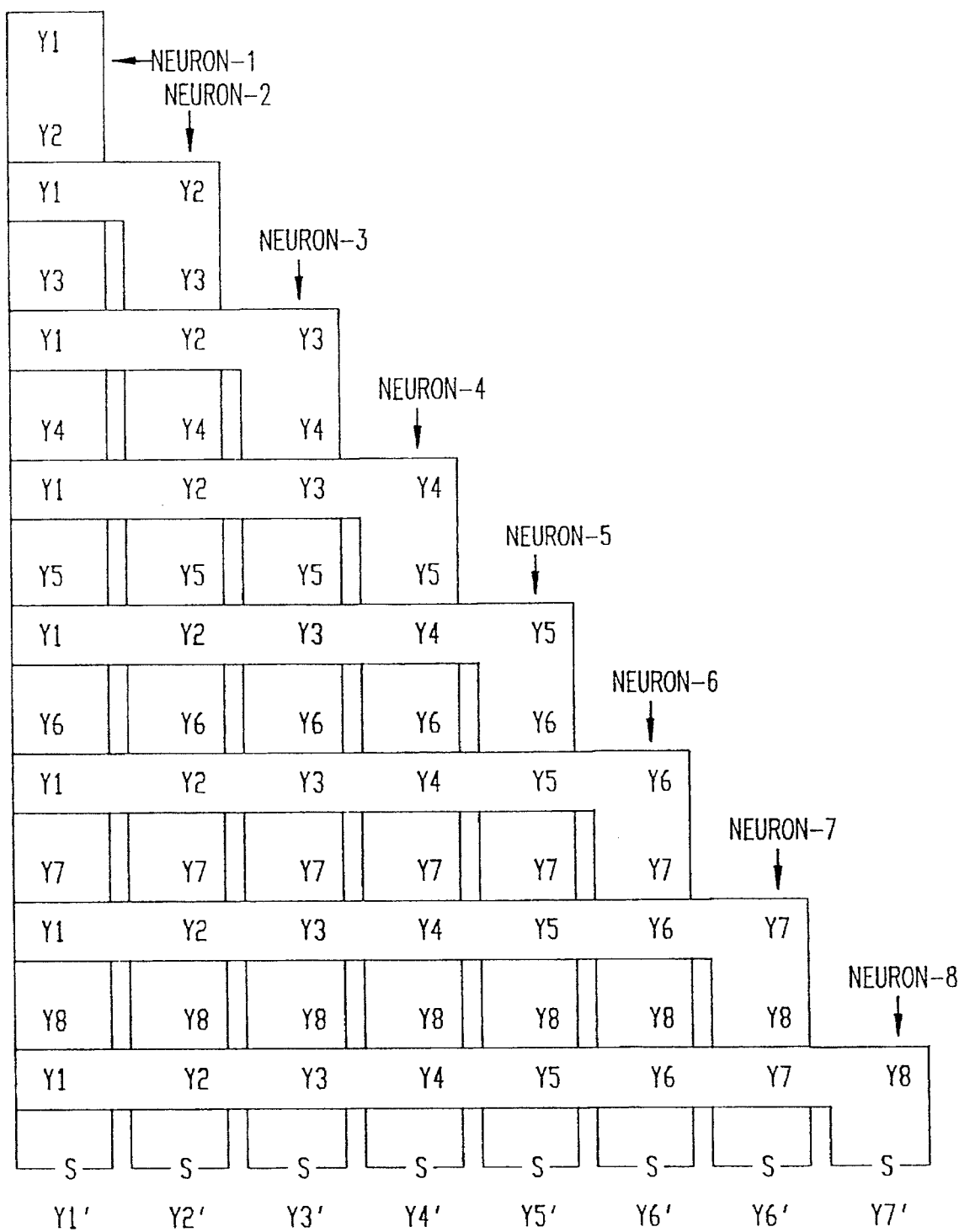
Figure 42D:
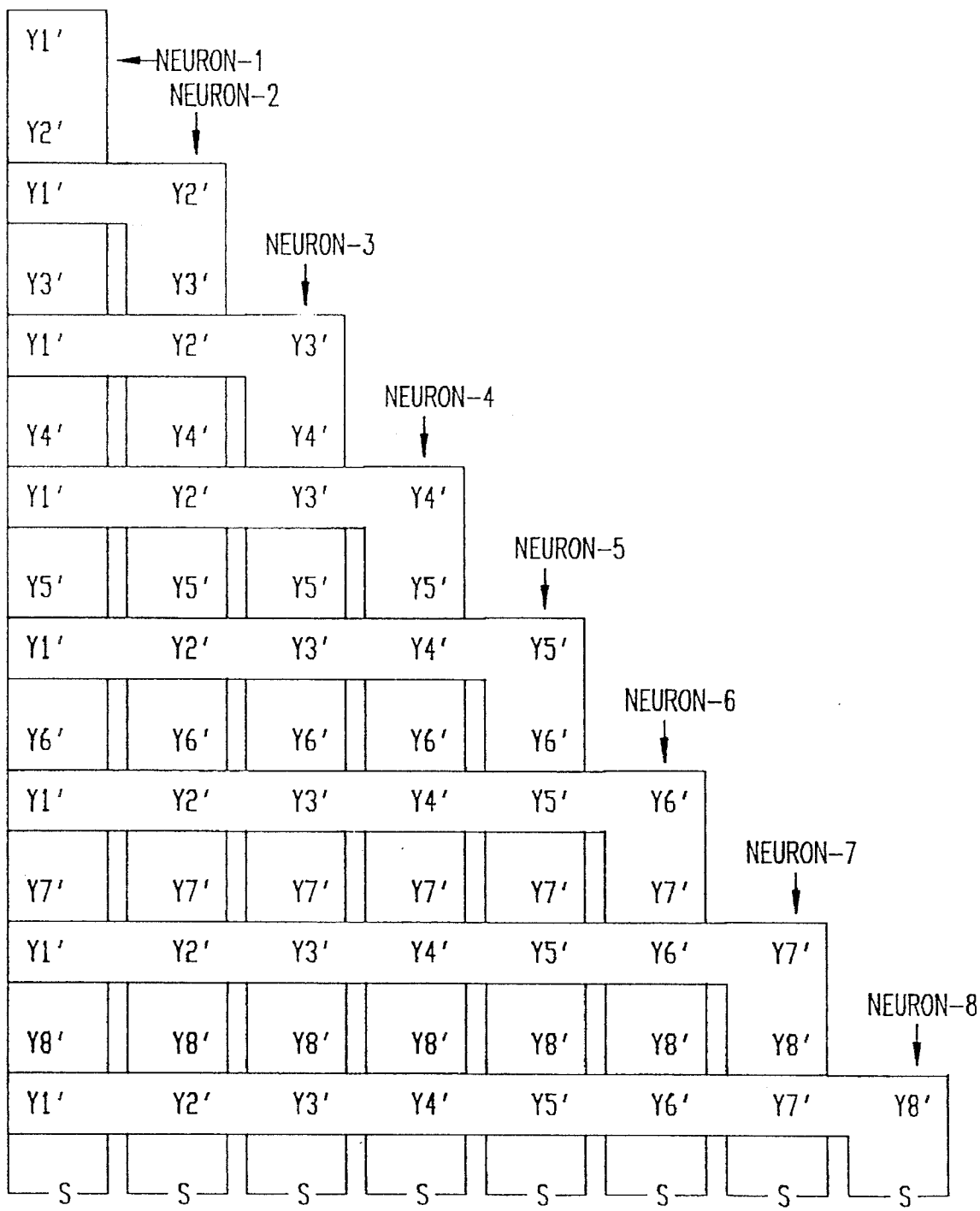

Using the "cell" symbols, an 8 neuron example is shown in FIG. 41 which connects the communicating adder trees and sigmoid generators to provide a complete picture of the neuron structures. The communicating add tree, FIG. 4, and the sigmoid generator, FIG. 6, are assumed. The $Y_j$ values, the sigmoid generator (SIG), and $Y_5'$ for Neuron 5 are highlighted in FIG. 41 by shading.

The four major steps in the operation of the T-SNAP are shown in the SNAP-SHOTS, FIG. 42, following the format of FIG. 39, where only the Y values are shown in the outlined neurons (weights omitted for clarity). For example, Neuron 5, producing $Y_5$, is made up of elements of four horizontal and three vertical "G-CELLS" and one diagonal cell. Neuron 5 is highlighted by shading in the four SNAP-SHOTS. The sigmoid generators are indicated by a S. Assuming initialization has already loaded the weights and first neuron values into the multiplier registers, the T-SNAP structure operates as follows: (The first four numbered functions correspond to SNAP-SHOTS 1, 2, 3, and 4 of FIG. 42.)

1. MULTIPLY NEURON VALUES $Y_j$ by weights $W_{ij}$. The multiplication is symbolized by placing an * in front of the Y value.
2. ADD TREE—provides the summation of the weighted neuron values, i.e. DRVR1s enabled and DRVR2s disabled. The summation function is symbolized by placing N-1+ signs in front of the Y values.
3. GENERATE NEURON VALUES—sigmoid generators produce $Y_i$s. This is indicated by the $Y_j'$(prime) being present at the sigmoid outputs.
4. REVERSE COMMUNICATE the neuron values $Y_j'$ back to be received in the specified multiplier input registers, see FIG. 40-B, DRVR2s enabled and DRVR1s disabled. This is indicated by the Y values with a prime symbol, ', indicating the Y value register has been updated.
5. Repeat steps 1–4 until the HOST specified number of iterations has been completed.

T-SNAP PERFORMANCE

T-SNAP follows the same operation sequence as SNAP, and provides the system elements for performing the following operations:

1. the multiplication of the Y values and weights
2. the summation of the multiplied products
3. the generation of new neuron values, in this case through a sigmoid generator
4. the reverse communication of the new neuron values to all neuron inputs Since T-SNAP provides the same sequential functions as SNAP with no delay gaps or additional processing time required, it provides the same performance capability as SNAP. T-SNAP accomplishes its performance with $N^2$ multipliers, N communicating adder trees, and N sigmoid generators while SNAP requires $N^2$ multipliers, 2N communicating adder trees, and 2N sigmoid generators.

$$\text{T-SNAP period} = \delta_M + (\log_2 N)\delta_A + \delta_S + (\log_2 N)\delta_B$$

Which under the same assumptions as SNAP, $\delta_A = \delta_B = 1C$, T-SNAP's period becomes:

$$\text{T-SNAP period} = \delta_M + 2(\log_2 N)C + \delta_S$$

T-SNAP SCALABILITY

Figure 44:
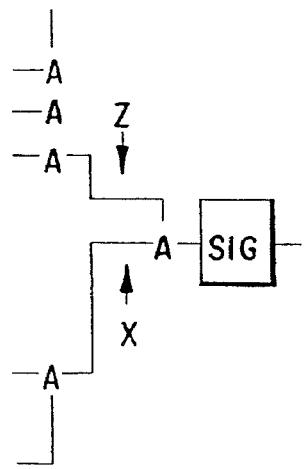
FIG. 44 shows an example of a scaled T-SNAP non symmetric add tree.

One possible way of scaling T-SNAP preferred for its simplicity of adding additional hardware at any time is by adding a row of cells for each additional neuron to be incorporated into the physical structure where each additional row is longer, (containing an additional G-CELL), than the previous row. FIG. 43 presents a ten neuron T-SNAP which was created from an eight neuron structure by adding two new rows to the original eight neuron assembly. The two new rows are printed in a bold font and capital A is used to represent the number 10. The added rows utilize separate communicating adder trees for the new elements with the final resultant sums from the new rows added, where required, with the final summation outputs of the existing structure. FIG. 44 presents an example of a summation tree for one neuron. The number of adder stages in the existing structure is not in general equal to the number of adder stages in the new rows. Symmetric add trees would occur if the number of neurons added was equal to the number of neurons in the existing structure. A non symmetric structure will not cause any hazards if the longest communicating adder tree path becomes the controlling path. When the summation value at the point labeled Z in FIG. 44 is available it will be added to the summation value labeled X which was available earlier but held until needed. The control of the summation path can be done in a number of ways, such as by tagging or by counting methods.

T-SNAP SUMMARY

T-SNAP provides the same neural emulation capabilities as SNAP but does so in a totally different manner, consequently, T-SNAP represents a new type of neurocomputing architecture. SNAP required 2N communicating adder trees and 2N sigmoid generators to accomplish the emulation of a completely connected neural network. T-SNAP, due to the folding of the weight matrix and the switch in data paths within the G-CELLS, is able to accomplish the same full connectivity with the same performance as SNAP but with only N communicating adder trees and N sigmoid generators.

While preferred embodiments of the invention have been illustrated and described, it is to be understood that such does not limit the invention to the precise constructions herein disclosed, and the right is reserved to all changes and modifications coming within the scope of the invention as defined in the appended claims.

What is claimed is:

1. A scalable neural array processor unit comprising:

a N neuron structure, said N neuron structure having input means for providing weights and/or values to the structure, and wherein the structure is interconnected to perform within a period;

means for multiplication of values and weights provided to the neuron structure;

means for summation of multiplied products of values by weights;

means for generation of new neuron values through a neuron activation function; means for communicatably connecting each weight storage unit containing a $W_{ji}$ weight to one containing a $W_{ij}$ weight; and means for reverse communication of the neuron values generated through said neuron activation function to neuron input means of said N neuron structure using the same path as used for the summation of multiplied products, and wherein the means for multiplication of weights and values includes a multiplier having multiplier input registers including a weight input register and a Y value input register and there is included means for sequentially performing (a) the multiplication of neuron values $Y_j$ by weights $W_{ij}$;

(b) the summing of the weighted neuron values by enabling summation means for outputting a summation function in one direction when said summation means is enabled, which summation means is capable, when disabled, to act as a communication path in a reverse direction;

(c) generating neuron values $Y_i'$ (prime) with neuron activation function elements at the neuron activation function outputs;

(d) reversing the enable-disable state of the summation means to communicate neuron values $Y_i$'s back to be received in a specified multiplier Y value input register, with said specified multiplier Y value input register indicating that the Y value register has been updated; and (e) repeating the steps (a)–(d) until a host specified number of iterations has been completed.

2. A scalable neural array processor unit comprising:

an N neuron structure, said N neuron structure having multipliers, communicating adder trees, and neuron activation functions;

symmetric weight storage connection means for connecting symmetric weight storage units; and means or reverse communicating an output of the neuron activation functions back through the adder trees to input multipliers of selected neurons, and wherein a summation tree is provided for a neuron structure tree having a plurality of adder trees and the neuron structure tree being such that a longest adder tree path is a controlling path.

3. A scalable neural array processor unit according to claim 2 wherein a neuron activation function is a non-linear sigmoid generator.

4. A scalable neural array processor unit according to claim 2 wherein there are N sigmoid generators for a neuron structure.

5. A scalable neural array processor unit according to claim 2 wherein a row of general cells each comprising a weight register, a value register, and a multiplier, are added in a row for each additional neuron to be incorporated in a physical structure where each additional row is longer than a previous row of the neuron structure.

6. The scalable neural array processor unit according to claim 2, wherein the symmetric weight storage connection means includes switch means for controlling a destination of data communicated through the adder trees.

7. A scalable neural array processor unit comprising:

a N neuron structure, said N neuron structure having input means for providing weights and/or values to the structure, and wherein the structure is interconnected to perform within a period;

means for multiplication of values and weights provided to the neuron structure;

means for summation of multiplied products of values by weights;

means for generation of new neuron values through a neuron activation function; and means for reverse communication of the neuron values generated through said neuron activation function to neuron input means of said N neuron structure using the same path as used for the summation of multiplied products, wherein the means for multiplication of weights and values includes a multiplier having multiplier input registers including a weight input register and a Y value input register and there is included provided means for sequentially performing (a) the multiplication of neuron values $Y_j$ by weights $W_{ij}$;

(b) the summing of the weighted neuron values by enabling summation means for outputting a summation function in one direction when said summation means is enabled, which summation means is capable, when disabled, to act as a communication path in a reverse direction;

(c) generating neuron values $Y_i'$ (prime) with neuron activation function elements at the neuron activation function outputs;

(d) reversing the enable-disable state of the summation means to communicate neuron values $Y_i'$ s back to be received in a specified multiplier Y value input register, with said specified multiplier Y value input register indicating that the Y value register has been updated; and (e) repeating the steps (a)–(d) until a host specified number of iterations has been completed.

8. A scalable neural array processor unit comprising:

an N neuron structure, said N neuron structure having multipliers, communicating adder trees, and neuron activation functions; and means for reverse communicating an output of the neuron activation functions back through the adder trees to input multipliers of selected neurons, with $N^2$ weights contained in the structure in the form of a weight matrix, wherein a summation tree is provided for a neuron structure tree having a plurality of adder trees and the neuron structure tree being such that a longest adder tree path is a controlling path.

9. A processor comprising:

an N neuron structure, said N neuron structure having multipliers, communicating adder trees, weight storage units, and neuron activation functions;

symmetric weight storage connection means for connecting symmetric ones of said weight storage units, such that each weight storage unit designated as $W_{ij}$ in the neuron structure is coupled to a weight storage unit designated as $W_{ji}$, where i is not equal to j, for communicating data between said symmetric weight storage units; and means for reverse communicating an output of the neuron activation functions back through the adder trees to input multipliers of selected neurons, and wherein a summation tree is provided for a neuron structure tree having a plurality of adder trees and the neuron structure tree being such that a longest adder tree path is a controlling path.

10. A computing structure comprising:

an N neuron structure, said N neuron structure having multipliers, communicating adder trees, weight storage units, and neuron activation functions;

connection means for connecting symmetric weight storage units within said neuron structure, such that each weight storage unit designated as $W_{ij}$ in the neuron structure is coupled to a weight storage unit designated as $W_{ji}$, where i is not equal to j, for communicating data between said coupled weight storage units; and means for reverse communicating an output of the neuron activation functions back through the adder trees to input multipliers of selected neurons, and wherein a summation tree is provided for a neuron structure tree having a plurality of adder trees and the neuron structure tree being such that a longest adder tree path is a controlling path.

\* \* \* \* \*